(12) United States Patent
Dexter et al.

(10) Patent No.: US 10,115,181 B2
(45) Date of Patent: Oct. 30, 2018

(54) SYSTEMS FOR AUTOMATICALLY ASSEMBLING TILE MAPS AND ASSOCIATED TECHNIQUES

(71) Applicant: Apple Inc., Cupertino, CA (US)

(72) Inventors: Ross R. Dexter, Santa Clara, CA (US); Timothy R. Oriol, San Jose, CA (US); Clement P. Boissiere, San Francisco, CA (US); Tyler L. Casella, Campbell, CA (US); Norman N. Wang, Saratoga, CA (US)

(73) Assignee: Apple Inc., Cupertino, CA (US)

(*) Notice: Subject to any disclaimer, the term of this patent is extended or adjusted under 35 U.S.C. 154(b) by 75 days.

(21) Appl. No.: 15/263,261

(22) Filed: Sep. 12, 2016

(65) Prior Publication Data

US 2017/0358057 A1    Dec. 14, 2017

Related U.S. Application Data

(60) Provisional application No. 62/348,967, filed on Jun. 12, 2016.

(51) Int. Cl.
  *G06T 3/40* (2006.01)
  *G06T 11/00* (2006.01)
  *G06T 11/60* (2006.01)
  *A63F 13/63* (2014.01)

(52) U.S. Cl.
  CPC .......... *G06T 3/4038* (2013.01); *A63F 13/63* (2014.09); *G06T 11/001* (2013.01); *G06T 11/60* (2013.01); *G06T 2207/10024* (2013.01); *G06T 2207/20021* (2013.01)

(58) Field of Classification Search
  CPC .......... B44C 3/123; B44C 3/126; G06T 11/60; G06T 3/4038; G06T 2207/20021; G06T 11/001; G06T 2207/10024
  USPC ........................................ 382/162, 209, 284
  See application file for complete search history.

(56) References Cited

U.S. PATENT DOCUMENTS

| | | |
|---|---|---|
| 7,414,629 B2 | 8/2008 | Santodomingo et al. |
| 7,565,028 B2 * | 7/2009 | Saed .............. G06K 9/64 345/629 |
| 7,589,742 B2 | 9/2009 | Street et al. |
| 8,115,765 B2 | 2/2012 | Sommers |
| 9,070,314 B2 | 6/2015 | Pahwa et al. |
| 2012/0268468 A1 | 10/2012 | Elenzil |

* cited by examiner

*Primary Examiner* — Daniel Mariam
(74) *Attorney, Agent, or Firm* — Ganz Pollard, LLC

(57) ABSTRACT

A method of assembling a tile map can include assigning each tile in a plurality of tiles to one or more color groups in correspondence with a measure of a color profile of the respective tile: A position of each tile in relation to one or more neighboring tiles can be determined from a position of a silhouette corresponding to each respective tile in relation to one or more neighboring silhouettes within a set containing a plurality of silhouettes. The plurality of tiles can be automatically assembled into a tile map, with a position of each tile in the tile map being determined from the color group to which the respective tile belongs and the determined position of the respective tile in relation to the one or more neighboring tiles. Tangible, non-transitory computer-readable media can include computer executable instructions that, when executed, cause a computing environment to implement disclosed methods.

20 Claims, 26 Drawing Sheets

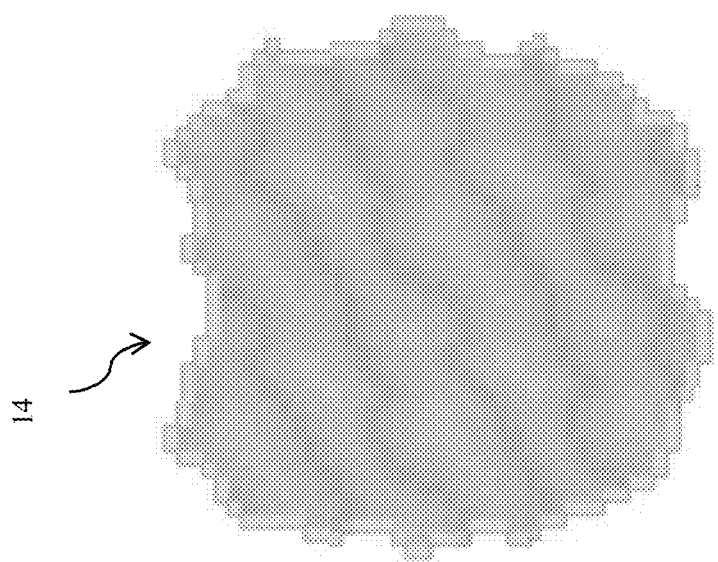
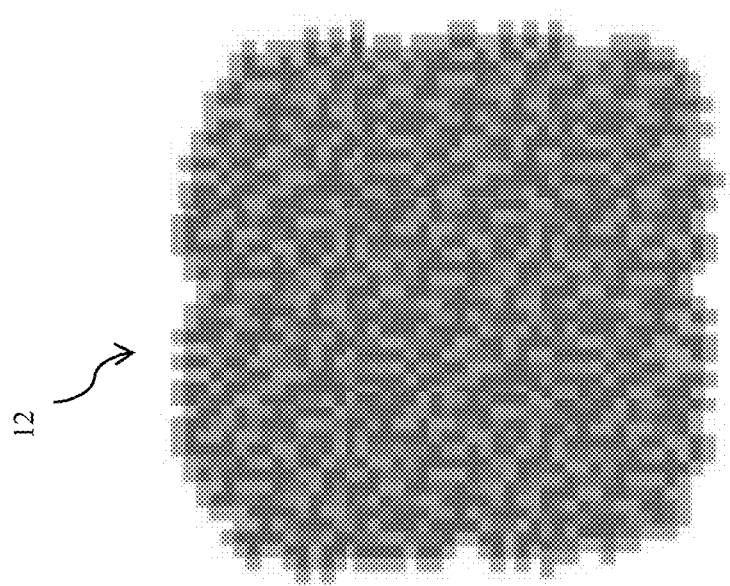
FIG. 1

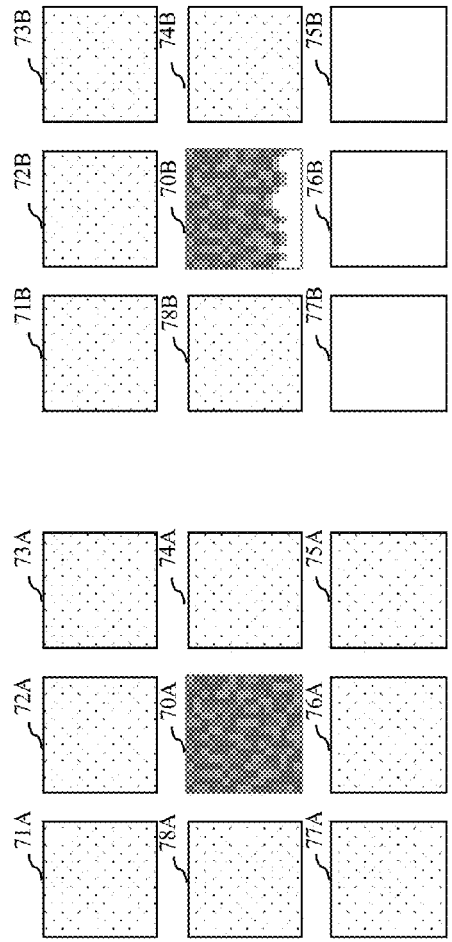
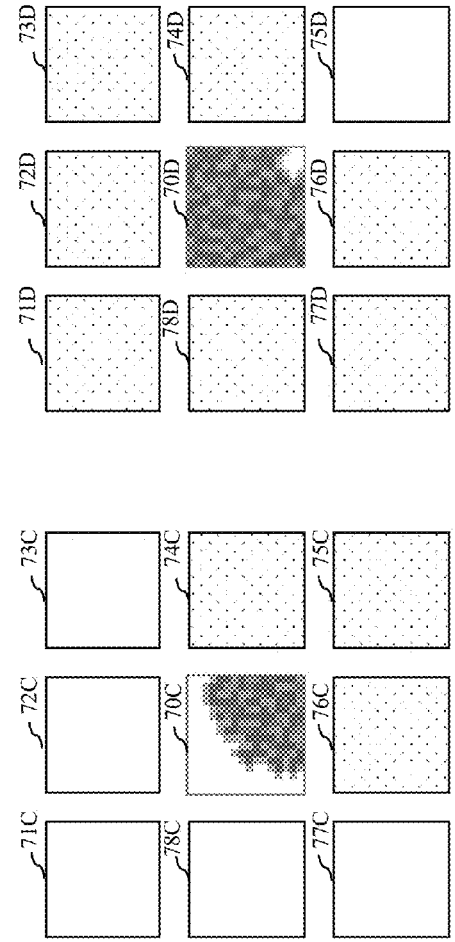

SYSTEMS FOR AUTOMATICALLY ASSEMBLING TILE MAPS AND ASSOCIATED TECHNIQUES

BACKGROUND

This application, and the innovations and related subject matter disclosed herein, (collectively referred to as the "disclosure") generally concern systems for automatically assembling tile maps and associated techniques. More particularly but not exclusively, disclosed tile-map-assembling systems and associated processing techniques can be incorporated in video game consoles or game engines. For example, a disclosed tile-map-assembling system can automatically assemble a given game world, or a portion thereof, from small, regular-shaped images called tiles, e.g., for a video game. Such tile maps (or "mosaics") can provide performance and memory advantages insofar as large image files containing an entire game world or level map does not need to be stored. Rather, such maps are assembled from small images, or image fragments, used one or more times.

As used herein, the term "tile" refers to a standard sized image that can be assembled into a mosaic with other standard sized images to render a composite image. The term "tile map" generally refers to a composite image incorporating a plurality of tiles. A tile can take on any of a variety of shapes (e.g., square, isometric, hexagonal, triangular, etc.) and/or sizes. A plurality of tiles available for use in generating a tile map is sometimes referred to as a "tile set" (and sometimes alternatively called a "sprite sheet"). Tiles can be laid adjacent to one another in a systematic arrangement, e.g., a grid. Some tiles can be allowed to overlap, for example, when a tile representing a unit is overlaid onto a tile representing terrain. Tile sets can be used in two dimensional (2D) video games to create complex mosaics, or tile maps, from reusable tiles within the set. Using a tile set to display a map can reduce the amount of system memory used as compared to a fully rendered map since a tiled mosaic can reuse a given tile multiple times in the map. A tile map can also reduce an amount of artwork needed to generate a plurality of individual maps since several different maps can be created from a given tile set. In order for a map made from a tile set to appear more distinctive, games can assemble and display maps from a plurality of tile sets, with each tile set corresponding to a respective environment.

Although a tile map can be a convenient way of efficiently organizing and rendering, e.g., 2D game maps, properly defining rules that govern how different tile images should be placed or oriented relative to each other to assemble a tile map is difficult. For example, although some video games provide a tile map editor to allow a user or a developer to create tile maps, manually placing and rotating tiles to assemble a tile map from a tile set is tedious and time consuming. In general, tiles can be conceptualized as puzzle pieces, and when a person examines them visually, it can become apparent how various tiles should fit together. However, describing how such tiles ought to fit together to a computing environment (e.g., a video game console or a game engine) is a surprisingly difficult task. For example, the shape of a tile's content can change depending on how the tile or its content is intended to interact with neighboring tiles. For example, a square tile that interacts with neighbors on all sides looks very different from one with neighbors on just on opposed (e.g., left and right) sides.

Thus, a need remains for computationally efficient techniques for procedurally describing overall shape and orientation of a tile's contents. As well, a need remains for computationally efficient techniques for automatically determining which tiles from a selected one or more tile sets belong together, and procedurally generating rules that control how the tiles are placed to assemble a tile map. And, improved systems and methods for assembling tile maps are needed.

SUMMARY

The innovations disclosed herein overcome many problems in the prior art and address one or more of the aforementioned or other needs. In some respects, the innovations disclosed herein are directed to methods and systems for automatically assembling tile maps from a plurality of tiles in a computationally efficient manner.

A method of assembling a tile map can include assigning each tile in a plurality of tiles to one or more color groups in correspondence with a measure of a color profile of the respective tile. A position of each of the tiles can be determined in relation to one or more of the neighboring tiles based on a position of a silhouette corresponding to the respective tile in relation to each silhouette corresponding to the one or more neighboring of the tiles within a set of silhouettes. The plurality of tiles can be automatically assembled into a tile map. A position of each tile in the tile map can be determined based on the color group to which the respective tile belongs and the determined position of the respective tile in relation to the one or more neighboring tiles.

In the foregoing and other embodiments, the correspondence between each respective tile and the corresponding silhouette can be based on a measure of concordance between the tile and the silhouette.

In certain embodiments, determining a position of each tile in relation to one or more neighboring tiles can include comparing each tile to each silhouette in the plurality of silhouettes.

In certain embodiments, determining a position of each tile in relation to one or more neighboring tiles can further include assigning each respective tile to a corresponding silhouette based on a measure of correspondence between the tile and the silhouette. For example, the measure of correspondence can be based on a measure of concordance between the tile and the silhouette.

The method of assembling a tile map can further include selecting the plurality of silhouettes based at least in part on a shape of the tiles.

Some disclosed methods also include generating a corresponding set of silhouettes for each of a plurality of tile shapes.

Some disclosed embodiments of generating a corresponding set of silhouettes include defining a central silhouette tile having a shape corresponding to a shape of each in the plurality of tiles. One or more neighboring silhouette tiles can be identified in relation to the central silhouette tile, and each neighboring silhouette tile can be assigned a filled status or an empty status. The filled status and the empty status can be permuted for each neighboring silhouette tile to define a plurality of combinations of neighboring silhouette tiles having filled and/or empty status. A silhouette of the central tile corresponding to each combination of neighboring silhouette tiles having a filled status and/or empty status can be generated.

Some disclosed embodiments of generating a silhouette of the central silhouette tile include dividing a perimeter of the central silhouette tile into a plurality of sequentially connected sections, wherein each section includes at least one line segment extending between two or more connection nodes, and wherein each section has a corresponding neighboring silhouette tile; and sequentially linking the connection nodes of each section having a corresponding neighboring silhouette tile with a filled status, and skipping each section having a corresponding neighboring silhouette tile with an empty status to generate a perimeter of the central silhouette tile.

In certain embodiments, dividing the perimeter of the central tile can further include dividing each edge of the perimeter.

In certain embodiments, linking the connection nodes further comprises drawing a straight line between adjacent linked connection nodes.

In certain embodiments, linking the connection nodes further comprises drawing a curved line between connection nodes juxtaposed with one or more skipped connection nodes. For example, the curved line comprises a Bezier curve.

In the foregoing and other embodiments, the tile can have a shape comprising a selected one or more of a square, a rectangle, a triangle, a parallelogram, and a hexagon.

In the foregoing and other embodiments, the color profile of the tile can include one or more of a color, a shade, a fill pattern, a hue, a saturation, a lightness, and an alphas transparency.

Also disclosed are tangible, non-transitory computer-readable media including computer executable instructions that, when executed, cause a computing environment to implement one or more methods disclosed herein. Digital signal processors suitable for implementing such instructions are also disclosed.

The foregoing and other features and advantages will become more apparent from the following detailed description, which proceeds with reference to the accompanying drawings.

BRIEF DESCRIPTION OF THE DRAWINGS

Unless specified otherwise, the accompanying drawings illustrate aspects of the innovations described herein. Referring to the drawings, wherein like numerals refer to like parts throughout the several views and this specification, several embodiments of presently disclosed principles are illustrated by way of example, and not by way of limitation.

FIG. 1 shows two tile maps having different color profiles.

FIGS. 7A through 7D show the same grid of square tiles as depicted in FIGS. 6A through 6D, except that the image in each neighboring tile is removed and each neighboring tile is respectively characterized as filled (shown in a dotted fill pattern) or empty (shown with no fill).

DETAILED DESCRIPTION

The following describes various innovative principles related to systems for automatically assembling tile maps and associated techniques by way of reference to specific tile-map-assembling system and method embodiments. For example, certain aspects of disclosed subject matter pertain to systems and methods for generating a complete set of silhouettes corresponding to a specific tile shape, and to systems and methods for characterizing the content of a tile by comparing the tile with a set of silhouettes, as well to systems and methods for assembling a tile map from a collection of tiles based on, for example, a color profile and a content of each tile. Embodiments of such systems and methods described in context of assembling tile maps for video games are but particular examples of contemplated systems and methods for assembling tile maps and are chosen as being convenient illustrative examples of disclosed principles. One or more of the disclosed principles can be incorporated in various other systems for assembling tiles to achieve any of a variety of corresponding system characteristics.

Thus, systems for assembling tile maps and associated techniques, having attributes that are different from those specific examples discussed herein can embody one or more presently disclosed innovative principles, and can be used in applications not described herein in detail, for example, in geometric map rendering, in scene generation for virtual reality or augmented reality, and so on. Accordingly, such alternative embodiments can also fall within the scope of this disclosure.

I. Overview

Disclosed systems for automatically assembling tile maps, and associated techniques, can be used to assemble, for example, a mosaic representing artificial terrain, as for a video game. As but one example, a method of assembling a tile map can include assigning each tile in a plurality of tiles to one or more color groups in correspondence with a measure of a color profile of the respective tile. A position of each tile can be determined in relation to one or more neighboring tiles based on a position of a corresponding silhouette in relation to one or more neighboring silhouettes within a set containing a plurality of silhouettes. The plurality of tiles can be automatically assembled into a tile map. A position of each tile in the tile map can be determined based on the color group to which the respective tile belongs and the determined position of the respective tile in relation to the one or more neighboring tiles.

II. Tile Content, Tile Color and Tile Shape

A tile map, or mosaic, can be assembled from a collection of small, regular-shaped tiles. Typically, for example, a two-dimensional tile can be represented by a two dimensional array of pixels.

Figure 6B:
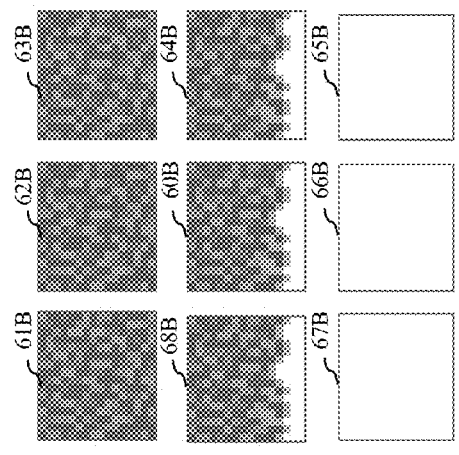
FIG. 6B shows a 3-by-3 grid of square tiles where the image scene is located in an upper portion of the tile grid.

A tile can be blank or empty, e.g., when the tile contains no image, as, for example, with tile the 67B in FIG. 6B. Alternatively, a tile can be wholly or partially filled to represent part of an image, as, for example, with the tile 68B in FIG. 6B. For an empty tile, the tile content can be characterized as being "null". For a tile filled or partially filled with an image, the tile content can be represented by a selected plurality of pixels in the tile that correspond to the tile image. Thus, the tile content of a filled or partially filled tile can characterize a geometric shape of the tile image. For example, the geometric shape of a given tile image can be represented by an area (or a perimeter of the area) covered by the tile image, or a contour of the tile image. Other representations are contemplated, including, for example, a piecewise-generated perimeter approximating a perimeter of an area covered by a tile image.

A tile image can have a color profile. The color profile of a given tile image can be characterized using any of a variety of measures. For example, a color profile can be defined using a conventional RGB color model or a conventional CMYK color model. In addition, or alternatively, a color profile can include one or more hue-saturation-lightness (HSL) colors as, for example, a complement to numerical RGB colors. Alpha transparency can be used to characterize a background color property. In another example, a tile image can consist of a combination of black-and-white pixels, and a corresponding color profile of such an image can be represented by a plurality of grey levels. In yet a further example, a color profile can be characterized by a plurality of hatch fill patterns.

A tile can take on any of a variety of shapes. For example, a tile shape can be square, isometric (a parallelogram), triangular, hexagonal, etc. For purposes of illustrating disclosed principles, square tiles are used as examples in the following description, unless specified otherwise, although it shall be understood that these principles also apply to other tile shapes.

III. Color Detector

Each in a plurality of tiles used to depict a specific scene or object typically has a complementary or otherwise consistent color profile in relation to the other of the plurality of tiles used to depict the scene or object. For example, FIG. 1 shows two tile images with different color profiles. The tile image 12 is assembled from primarily green tiles as can be used to depict a grass field, and the tile image 14 is assembled primarily from brown tiles as can be used to depict a sandy area.

Figure 25:
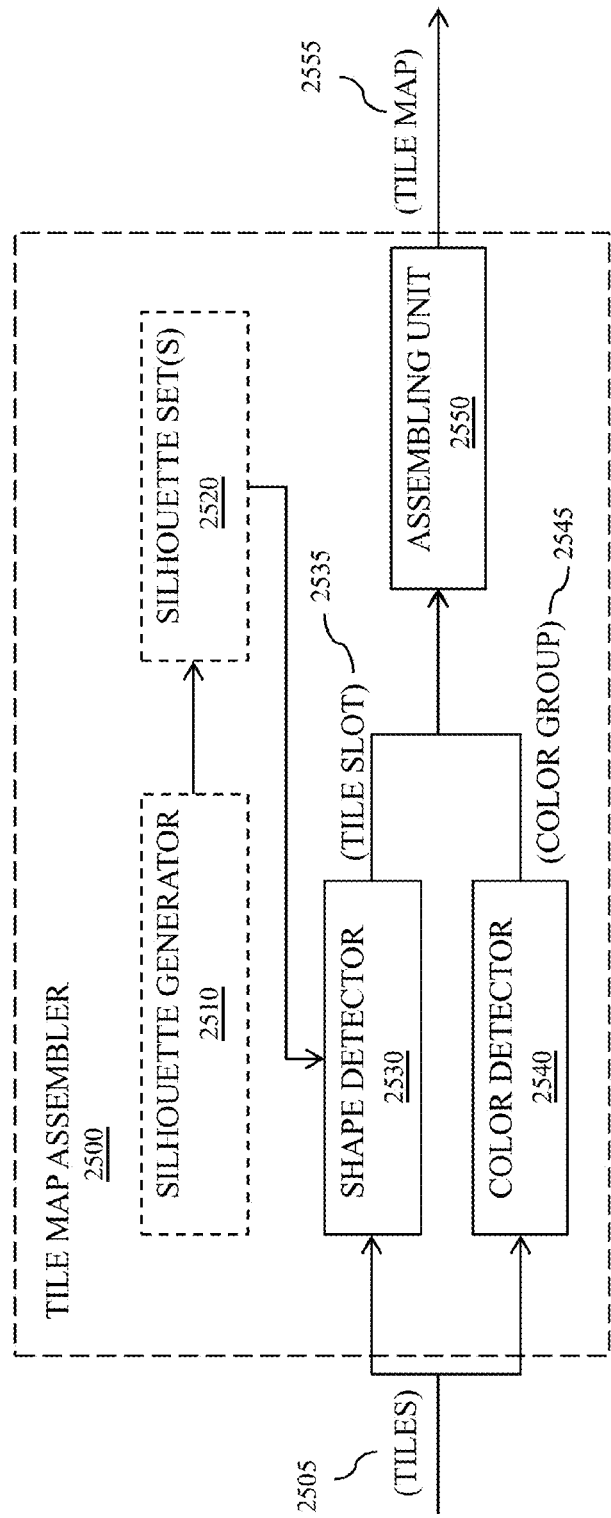
FIG. 25 shows a schematic block diagram of a tile map assembler suitable for implementing one or more technologies disclosed herein.

To construct a tile map from a collection of tiles, a set of input tiles can be sorted according to color groups, e.g., based on a selected one or more color profiles represented by the set of input tiles. For example, as illustrated in FIG. 25, a tile map assembler 2500 can include a color detector 2540, which can measure or otherwise determine a color profile of each input tile 2505 and assign the respective tile to one or more color groups 2545 corresponding to the observed color profile of such tile. The color detector 2540 can assign input tiles 2505 to a corresponding color group 2545 based on observed color profiles (e.g., hue, saturation, lightness, alpha transparency, hatch fill pattern, grey level, and so on), either individually or in combination. For example, input tiles having predominantly green color can be assigned to a green tile color group, and tiles having predominantly brown color can be assigned to a brown tile color group, etc. Available color groups can be predetermined or user-defined based on desired characteristics of the tile map.

IV. Neighboring Tiles

In a tile map, each non-boundary tile can be surrounded by a plurality of non-overlapping neighbor tiles. The perimeter (or contour) of a given tile can be formed by a plurality of edges juxtaposed with a plurality of vertices. In the map, each neighboring tile shares at least one edge and/or at least one vertex with the respective central tile, and each respective neighboring tile can share at least two of its edges with other neighboring tiles. A neighboring tile is referred to herein as a side neighbor if it shares at least an edge with the central tile. A neighboring tile is a referred to herein as vertex neighbor if it shares only a vertex with the central tile. The number of neighboring tiles (N) depends on the shape of the central tile and, in some instances, a selected arrangement of neighboring tiles relative to a central tile (as when tiles are non-uniformly shaped).

Figure 2:
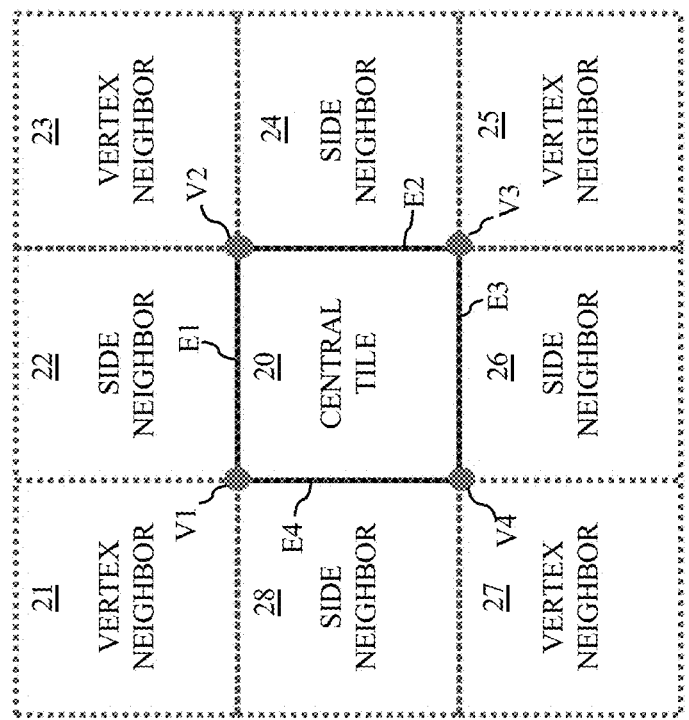
FIG. 2 shows a central square tile surrounded by eight neighboring square tiles.

As shown in FIG. 2, a central square tile 20 can be surrounded by eight neighboring square tiles (i.e., N=8): four side neighbors (22, 24, 26 and 28) and four vertex neighbors (21, 23, 25 and 27). The central tile 20 has four edges (E1, E2, E3 and E4) and four vertices (V1, V2, V3 and V4). In the case of uniformly square tiles, each of the side neighbors shares one edge and two vertices with the central tile 20. Each vertex neighbor shares only one vertex with the central tile 20.

Figure 3:
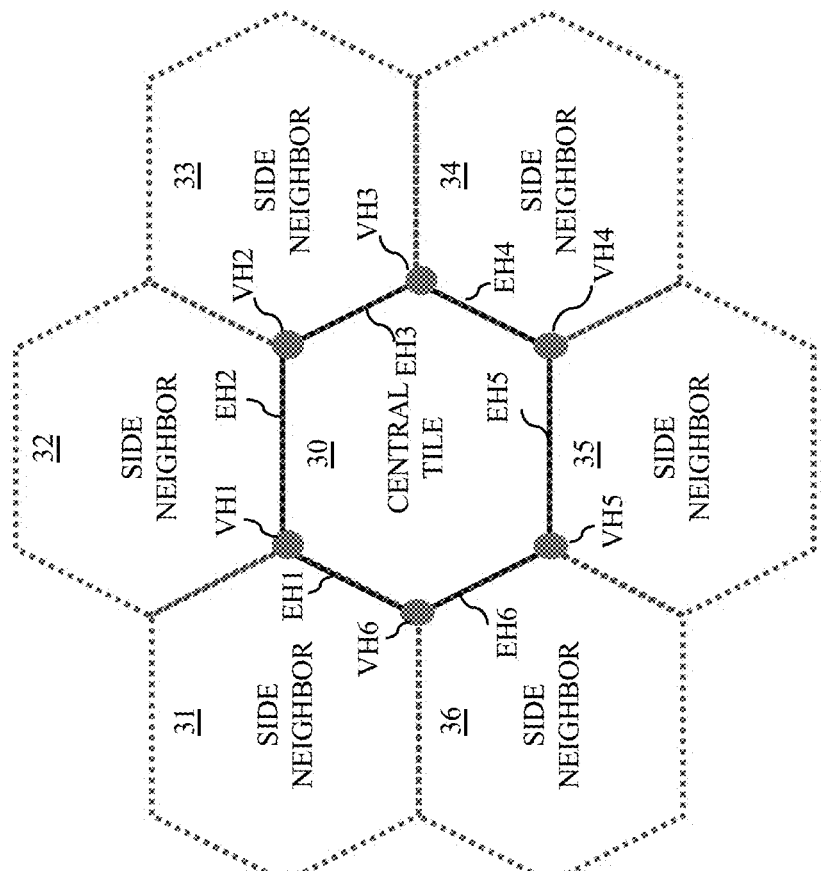
FIG. 3 shows a central hexagonal tile surrounded by six neighboring hexagonal tiles.

As shown in FIG. 3, a central hexagonal tile 30 can be surrounded by six neighboring hexagonal tiles (i.e., N=6): six side neighbors (31, 32, 33, 34, 35 and 36) and no vertex neighbor. The central tile 30 has six edges (EH1, EH2, EH3, EH4, EH5 and EH6) and six vertices (VH1, VH2, VH3, VH4, VH5 and VH6). In the case of uniformly hexagonal tiles, each of the side neighbors shares one edge and two vertices with the central tile 30.

Figure 4:
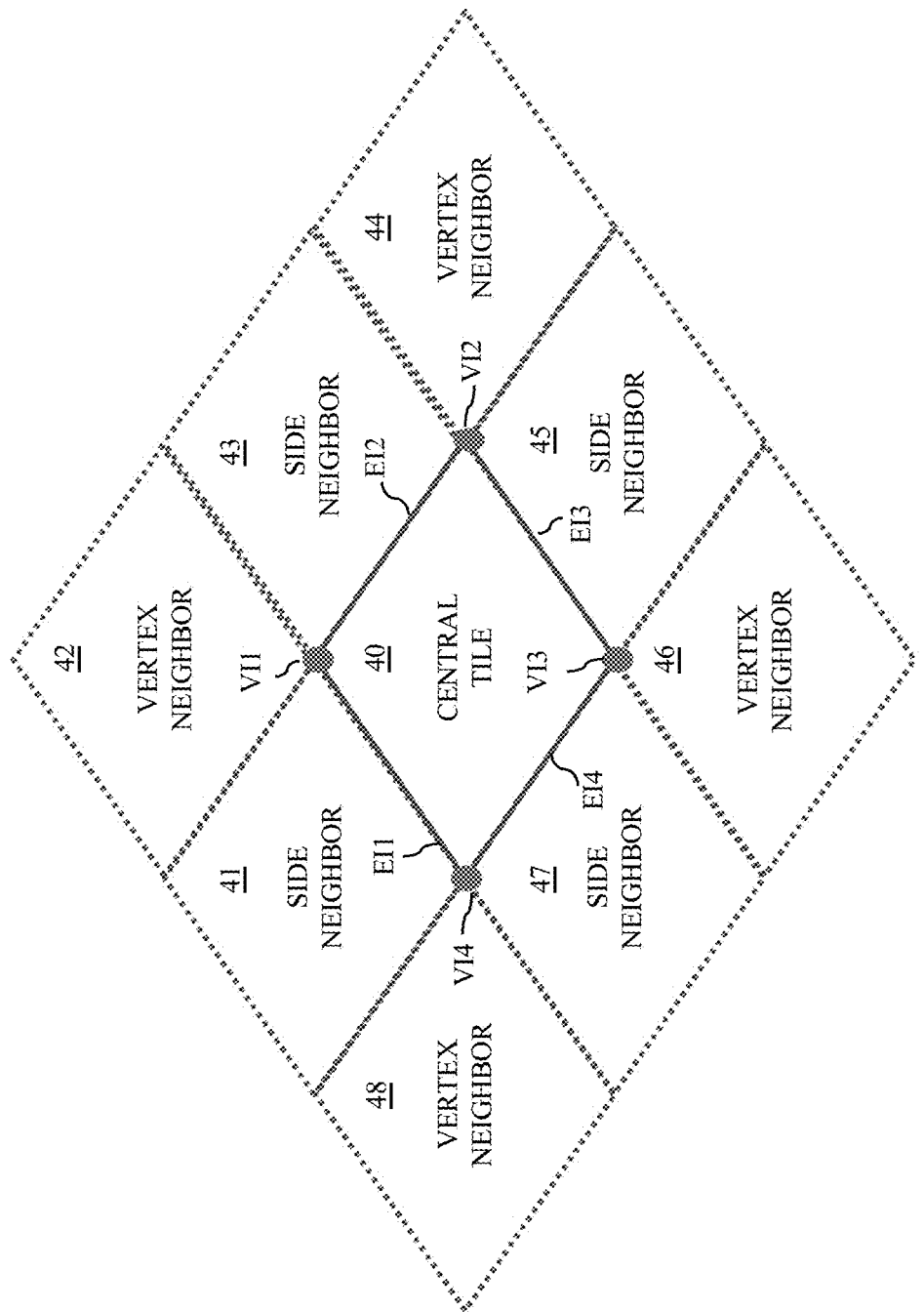
FIG. 4 shows a central isometric tile surrounded by eight neighboring isometric tiles.

As shown in FIG. 4, a central isometric tile 40 can be surrounded by eight neighboring isometric tiles (i.e., N=8): four side neighbors (41, 43, 45 and 47) and four vertex neighbors (42, 44, 46 and 48). The central tile 40 has four edges (EI1, EI2, EI3 and EI4) and four vertices (VI1, VI2, VI3 and VI4). In the case of uniformly isometric tiles, each of the side neighbors shares one edge and two vertices with the central tile 40, and each of the vertex neighbors shares only one vertex with the central tile 40.

Figure 5:
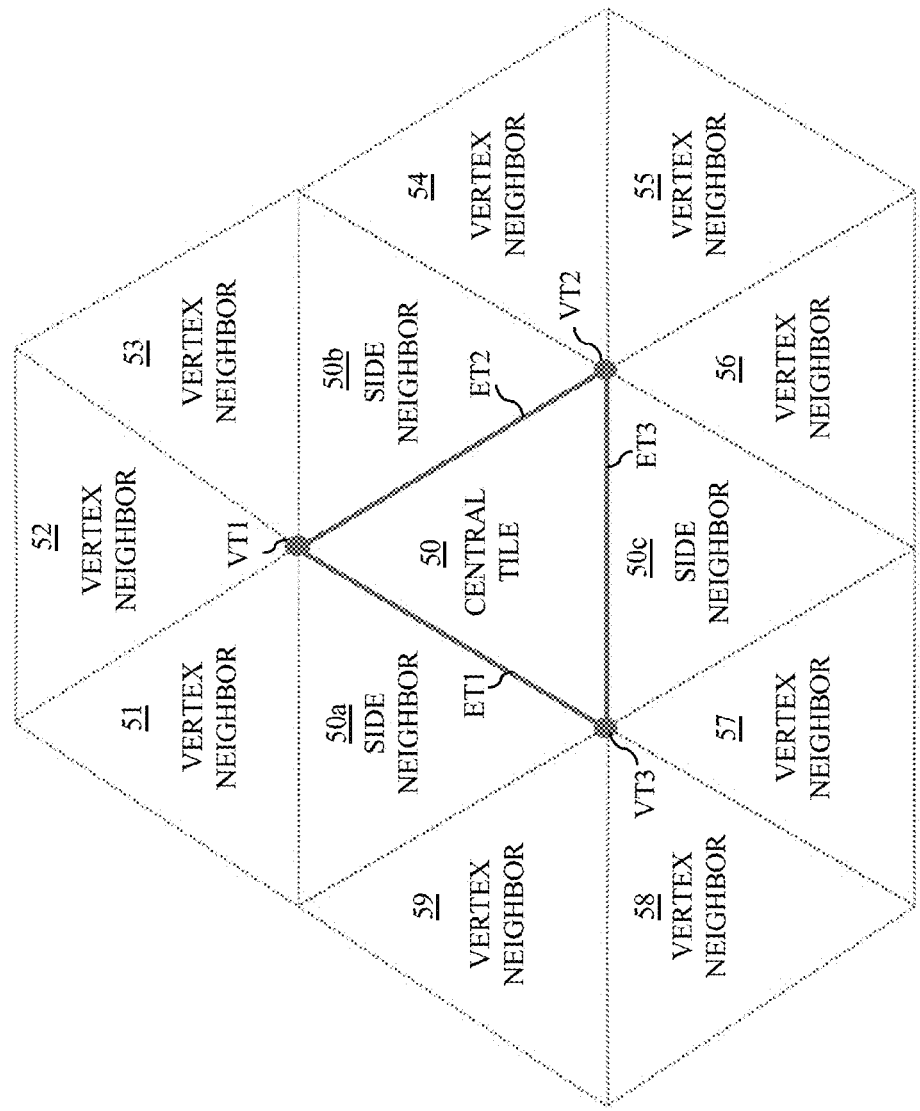
FIG. 5 shows a central triangular tile surrounded by twelve neighboring triangular tiles.

As shown in FIG. 5, a central triangular tile 50 can be surrounded by twelve neighboring triangular tiles (i.e., N=12): three side neighbors (50a, 50b and 50c) and nine vertex neighbors (51 through 59). In the illustrated example, the central tile 50 has three edges (ET1, ET2 and ET3) and three vertices (VT1, VT2 and VT3). In the case of uniformly sized equilateral triangles, as in FIG. 5, each of the side neighbors shares one edge 52 and two vertices 54 with the central tile 50, and each of the vertex neighbors shares only one vertex 54 with the central tile 50.

V. Positional Relationship Between Tiles

Figure 6D:
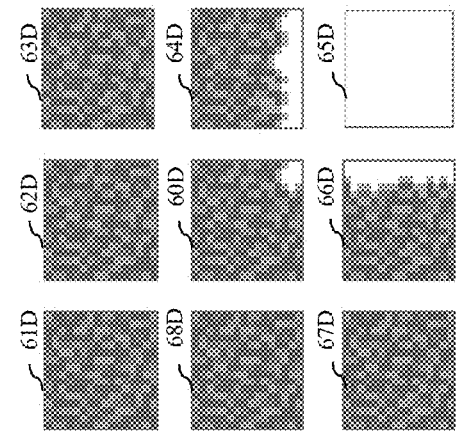
FIG. 6D shows a 3-by-3 grid of square tiles where the image scene is located in most of the tile grid except a lower-right portion of the tile grid.
Figure 6A:
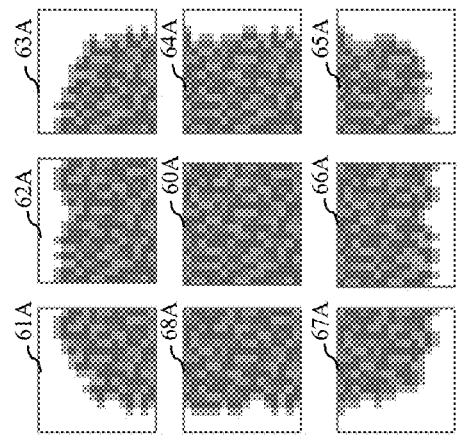
FIG. 6A shows a 3-by-3 grid of square tiles where the image scene is located in a center portion of the tile grid.
Figure 6C:
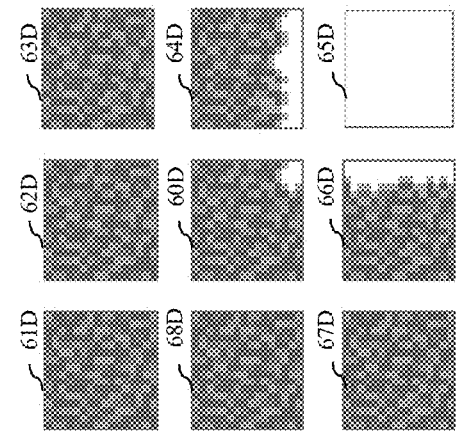
FIG. 6C shows a 3-by-3 grid of square tiles where the image scene is located in a lower right portion of the tile grid.

FIGS. 6A-6D depict four examples of 3-by-3 arrangements of square tiles, each arrangement being a representative example of part of a larger tile map. In FIG. 6A, the representative image scene is centered in the tile grid. In FIG. 6B, the representative image scene is located in an upper portion of the tile grid. In FIG. 6C, the image scene is located in a lower right region of the tile grid. In FIG. 6D, the image scene is located in all but a lower right region of the tile grid.

Each tile in the foregoing exemplary portions of a tile map can contain a portion of a mosaic image (filled) or be devoid of any portion of the mosaic image (empty). For example, in FIG. 6A, all tiles 60A through 68A can be considered as being filled to some degree. In FIG. 6B, tiles 65B, 66B and 67B are empty and the remaining tiles can be considered as being filled to some degree. In FIG. 6C, tiles 60C, 64C, 65C and 66C can be considered as being filled to some degree and the other tiles are empty. In FIG. 6D, only tile 65D is empty and the other tiles are filled at least partially.

Each tile image in an arrangement of tiles depicting a specific scene or object typically has a characteristic shape, which can be reflected in a corresponding spatial pattern or arrangement, of filled and/or empty neighboring tiles in a selected tile arrangement (e.g., a 3-by-3 grid for squares: see FIGS. 2, 3, 4, 5). For illustrative purpose, FIGS. 7A-7D show a spatial pattern of filled or partially filled neighboring tiles (shown in dotted fill pattern) and/or empty neighboring tiles (shown in blank) in relation to each central tile shown in FIGS. 6A-6D, respectively.

For example, FIG. 7A indicates a tile image at least partially fills all neighboring tiles 71A-78A to maintain continuity with the tile image in tile 70A (e.g., tile 70A is not a part of a border of a mosaic image). FIG. 7B indicates tiles 75B, 76B and 77B are empty and that the mosaic image at least partially fills an upper portion of the tile grid (e.g., tile 70B contains a tile image forming a part of a lower border of a mosaic image). FIG. 7C indicates the image fills a lower right region of the 3-by-3 grid, as tiles 70C, 74C, 75C and 76C of the tile grid are at least partially filled and the remaining tiles 71C, 72C, 73C, 77C and 78C are empty (e.g., tile 70C contains a tile image forming a part of an upper left border of a mosaic image). FIG. 7D indicates the image at least partially fills all except for the lower right corner tile, i.e., tile 75D, of the tile grid (e.g., tile 70D mosaic contains a tile image forming a part of a lower right border of an image).

Each distinct spatial pattern of filled and/or empty neighboring tiles corresponds to a given configuration of a tile image in the respective central tile. Stated differently, a positional relationship between the central tile and its neighboring tiles that are at least partially filled and empty can indicate an arrangement of a tile image in the central tile relative to neighboring tiles.

Since each neighboring tile can have two statuses (filled or empty), the total number of tile configurations is $2^N$, where N is the total number of neighboring tiles for a given tile shape. For example, for a square tile (N=8), there are a total of 256 configurations of filled and/or empty neighboring tiles relative to a central tile.

V. Silhouette

As used herein, the term "silhouette" refers to a template image which approximately outlines or depicts a geometric shape of a given tile image, or tile content. A tile containing a silhouette can have the same or different size as an input tile on which the silhouette is based. A silhouette characteristic, e.g., a geometric shape of a shaded region of the silhouette, can be represented by an area of a template tile covered by the silhouette (e.g., pixels underlying the silhouette) or a contour of the silhouette within the template tile. For an empty input tile (no tile image), the corresponding silhouette is typically an empty silhouette (no silhouette). Exemplary template tiles and silhouettes are depicted in FIG. 8.

Figure 8:
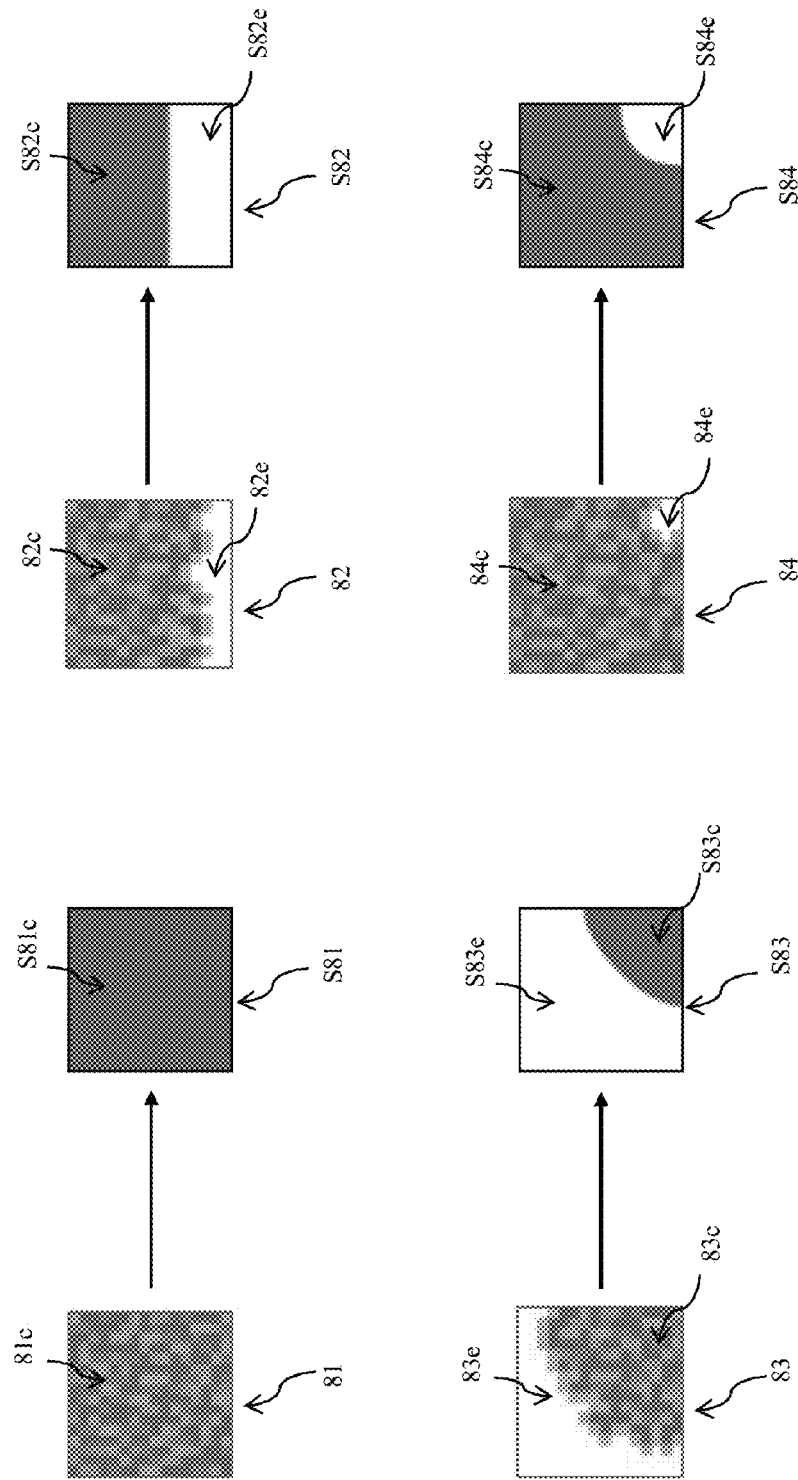
FIG. 8 shows four examples of square tile images and a corresponding silhouette for each.

In FIG. 8, each of the four representative input tiles 81, 82, 83 and 84 can be visually represented by a corresponding silhouette S81, S82, S83 and S84, respectively. Each of the silhouettes has an outer contour and shaded area selected to characterize or represent the content of the corresponding tile image. For example, the image in tile 81, referred to as "tile content" 81c, completely fills the tile 81. For the tile S81 containing the corresponding silhouette, the silhouette content S81c also completely fills the tile S81. In another example, the image in tile 82 (its tile content 82c), fills an upper part or region of the tile 82, while an empty space 82e is located in a lower part of the tile 82. For the tile S82 containing the corresponding silhouette, the silhouette content S82c also fills an upper part of the tile S82, while an empty space S82e is located in the lower part of the tile S82. In the third example, the image 83c in tile 83, fills a lower right corner of the tile 83, while an empty space 83e occupies the remaining area of the tile 83. For the tile S83 containing the corresponding silhouette S83, the silhouette content S83c also fills the lower right corner of the tile S83, while an empty (or null) space S83e occupies the remaining area of the tile S83. In the last example, an empty space 84e is located in the lower right corner of tile 84 while the image 84c, fills the remaining area of the tile. For the corresponding tile S84, an empty space S84e is also located in the lower right corner while the silhouette content S84c fills the remaining area of the silhouette tile S82.

Figure 9:
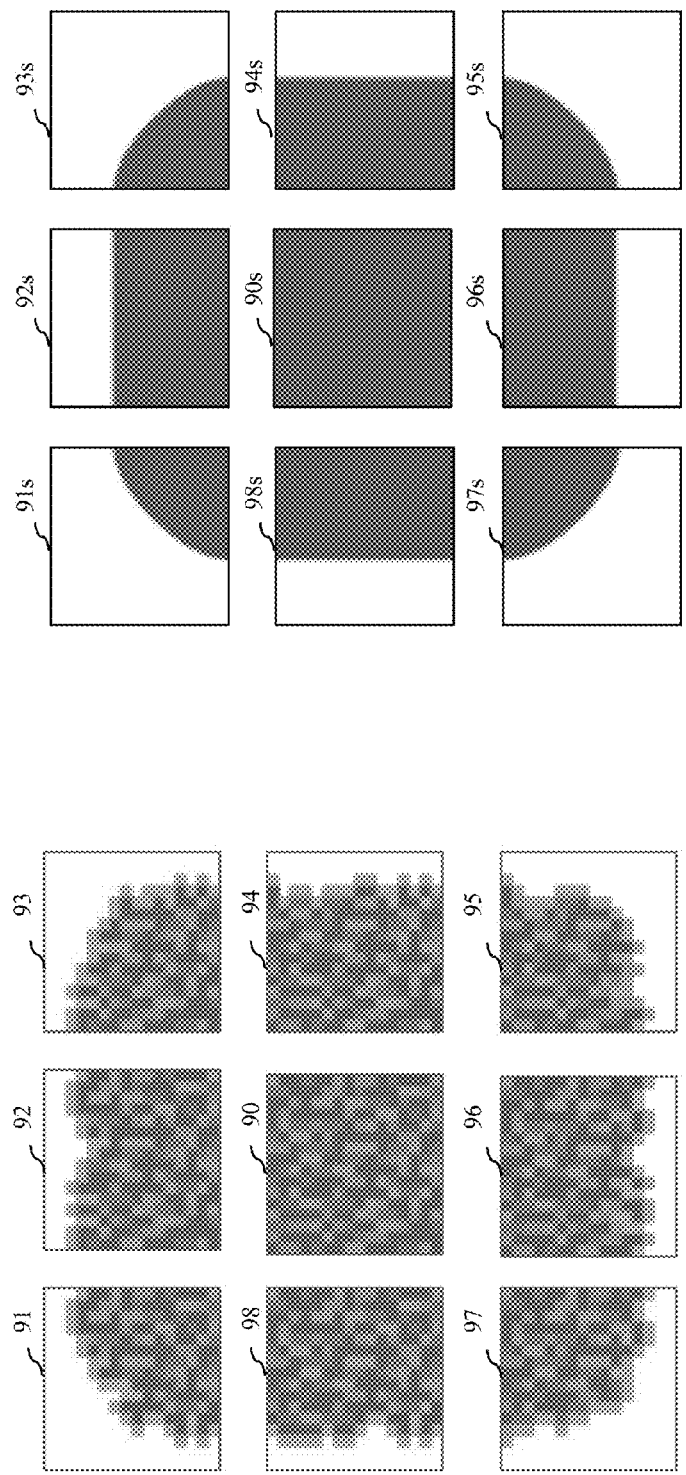
FIG. 9 shows the same grid of square tiles as in FIG. 6A, and a corresponding 3-by-3 grid of silhouettes.

In another example, FIG. 9 shows a grid of square tiles as in FIG. 6A (numbered to 90 through 98) and a corresponding 3-by-3 grid of silhouette tiles 90s through 98s.

Each silhouette in a respective silhouette tile can provide a visual cue regarding which neighboring tile(s) are filled and which of its neighboring tile(s) are empty. As used herein, and in the following descriptions, a filled tile can also represent a partially filled tile. For example, in FIG. 8, silhouette S81 represents a tile having all neighboring tiles filled, indicating the tile is likely not a part of an image border. Silhouette S82 represents a tile whose three downwards neighboring tiles are empty and the other neighboring tiles are filled, indicating the tile is likely a part of a lower border of an image. Silhouette S83 represents a tile having all neighboring tiles empty except for three down-right tiles, indicating the tile is a likely part of an upper-left border of an image. Silhouette S84 represents a tile having all neighboring tiles filled except for the downward right neighbor, indicating the tile is likely a part of a lower right border of a composite image.

Thus, each silhouette can generally represent a tile characteristic indicative of the tile's position in relation to one or more neighboring tiles. Consequently, a set of silhouettes and silhouette tiles can be generated to represent, generally, a corresponding plurality of tile characteristics suitable to facilitate assembling a tile map. The total number of possible silhouettes in a set of silhouettes generated using the approach described below, and assuming a tile silhouette's size matches the size of an image tile, is $2^N$, where N is the total number of neighboring tiles for a given tile shape. For example, for a square tile (N=8), the corresponding set of silhouettes has a total of 256 silhouettes. More refined silhouettes can give rise to a larger number of possible silhouettes in a set, for example.

As described more fully below, a set of silhouettes can be generated on-demand, or pre-generated before assembling a tile map. For example, a corresponding set of silhouettes can be pre-generated for each of a plurality of tile shapes (e.g., one set of silhouettes for square tiles, one set of silhouettes for hexagonal tiles, etc.) and saved in a memory location of a computing environment. To assemble a tile map from a collection of input tiles, the set of silhouettes corresponding to the shape of the input tile can be retrieved for processing as described below.

VI. Silhouette Generator

As shown in FIG. 25, a set of silhouettes 2520 for a given tile shape can be generated automatically by the silhouette generator 2510. Each silhouette in the set can represent a corresponding arrangement of an image tile in relation to adjacent filled or empty tiles. The silhouette generator 2510 can implement a method for procedurally generating silhouettes as described below in relation to FIG. 23.

Figure 23:
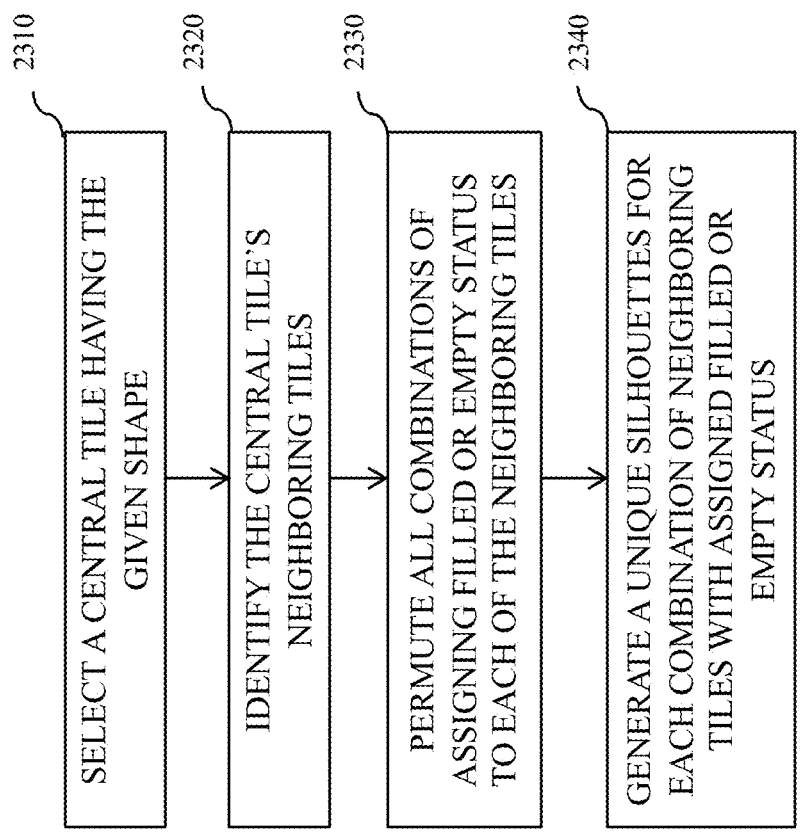
FIG. 23 shows a block diagram of a process for generating a complete set of silhouettes for a given tile shape.

FIG. 23 shows a process of generating a set of silhouettes for a given shape of tile. In step 2310, the method selects a central tile having the tile shape. In step 2320, the method identifies one or more neighboring tiles in relation to the central tile. In step 2330, the method assigns each neighboring tile a filled status or an empty status, and permutes the filled status and the empty status for each neighboring tile to define a plurality of combinations of neighboring tiles having filed and/or empty status. In step 2340, the method generates a silhouette of the central tile corresponding to each combination of neighboring tiles having a filled status and/or an empty status.

Figure 24:
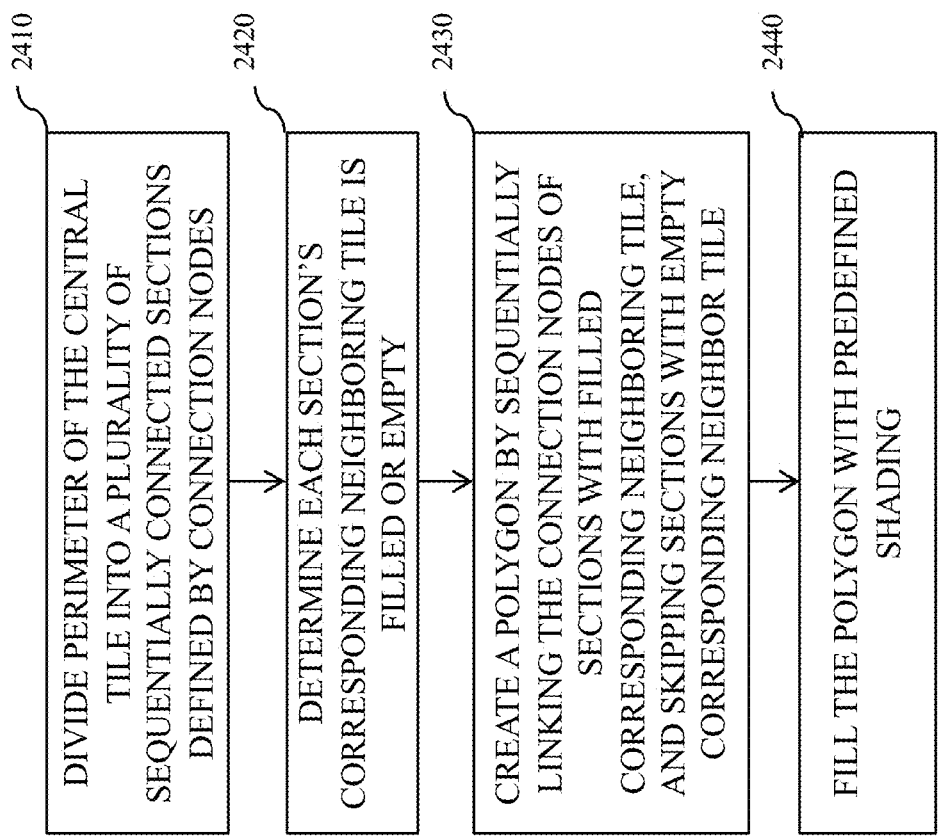
FIG. 24 shows a block diagram of a process for generating a unique silhouette corresponding to a specific tile configuration.

FIG. 24 shows a process of generating a silhouette for a central tile representative of a particular combination of filled and/or empty neighboring tiles. In step 2410, a perimeter of a central tile is divided into a plurality of sequentially connected sections (or segments). Each section has at least one line segment extending between two or more connection nodes. Each section also has a corresponding neighboring tile. In step 2420, the method determines whether each section's neighboring tile is filled or empty. In step 2430, the method sequentially links the connection nodes of each section having a corresponding neighboring tile with a filled status, and skips each section having a corresponding neighboring tile with an empty status to generate a silhouette perimeter representative of the image content in the central tile (e.g., a polygon). Sequentially linking the connection nodes can proceed in either a clockwise or a counter-clockwise direction as long as the direction does not change after linking begins. At 2440, the method fills the generated polygon with a selected shading. Step 2440 can be optional. A silhouette can be fully defined by the perimeter, which specifies the contour of the silhouette, as well as the area enclosed by the contour. However, filling the silhouette with shading is believed to facilitate visualization of the silhouette.

Figure 10:
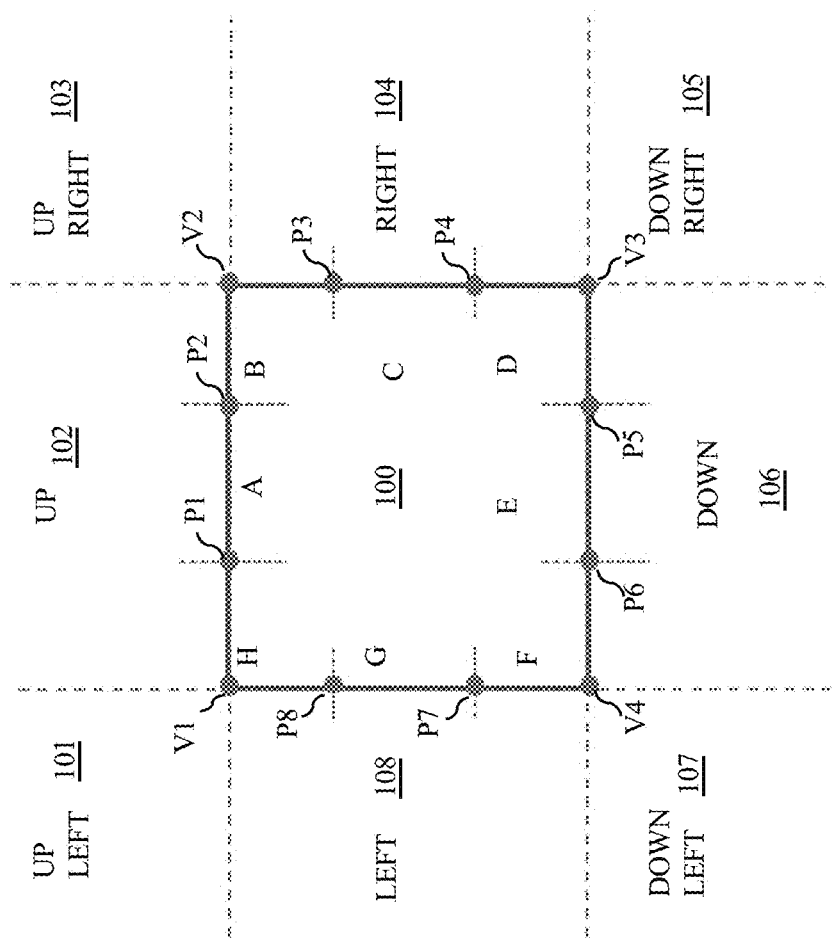
FIG. 10 schematically illustrates the perimeter of a square tile divided into a plurality of sequentially arranged sections.

FIG. 10 illustrates the perimeter of a central tile divided into a plurality of sequentially connected sections A through H. Each section has at least one line segment spanning between two connection nodes (e.g., section A has one segment extending between connection nodes P1 and P2, section B has two segments between connection nodes P2 and P3, etc.). Each connection node is represented by a dot P1 through P8 or vertex V1 through V4. A section located on one edge (edge section) has a single line segment and two connection nodes at opposed ends of the line segment (e.g., section A connects nodes P1 and P2; section C connects nodes P3 and P4; etc.). On the other hand, a section spanning two adjacent edges (corner section) has two line segments and three connection nodes: one segment on each edge, and a connection node at the vertex between the line segments. For example, section B has a first line segment extending from P2 to V2 and a second line segment extending from V2 to P3.

Each section has a corresponding neighboring tile (e.g., section A corresponds to side neighbor 102, section B corresponds to vertex neighbor 103, section C corresponds to side neighbor 104, and so on).

FIGS. 11-15 illustrate several silhouette contours generated to represent corresponding combinations of filled and empty tiles surrounding a central tile, whose content the respective silhouette contour is intended to represent. In those drawings, connection nodes of a silhouette are similarly labelled as compared to the nodes of a tile (e.g., V1, V2, P1, P2, etc.) by adding a subscript 's' to the respective reference characters associated with the silhouette tile (e.g., V1s, V2s, P1s, P2s, etc.).

Figure 11:
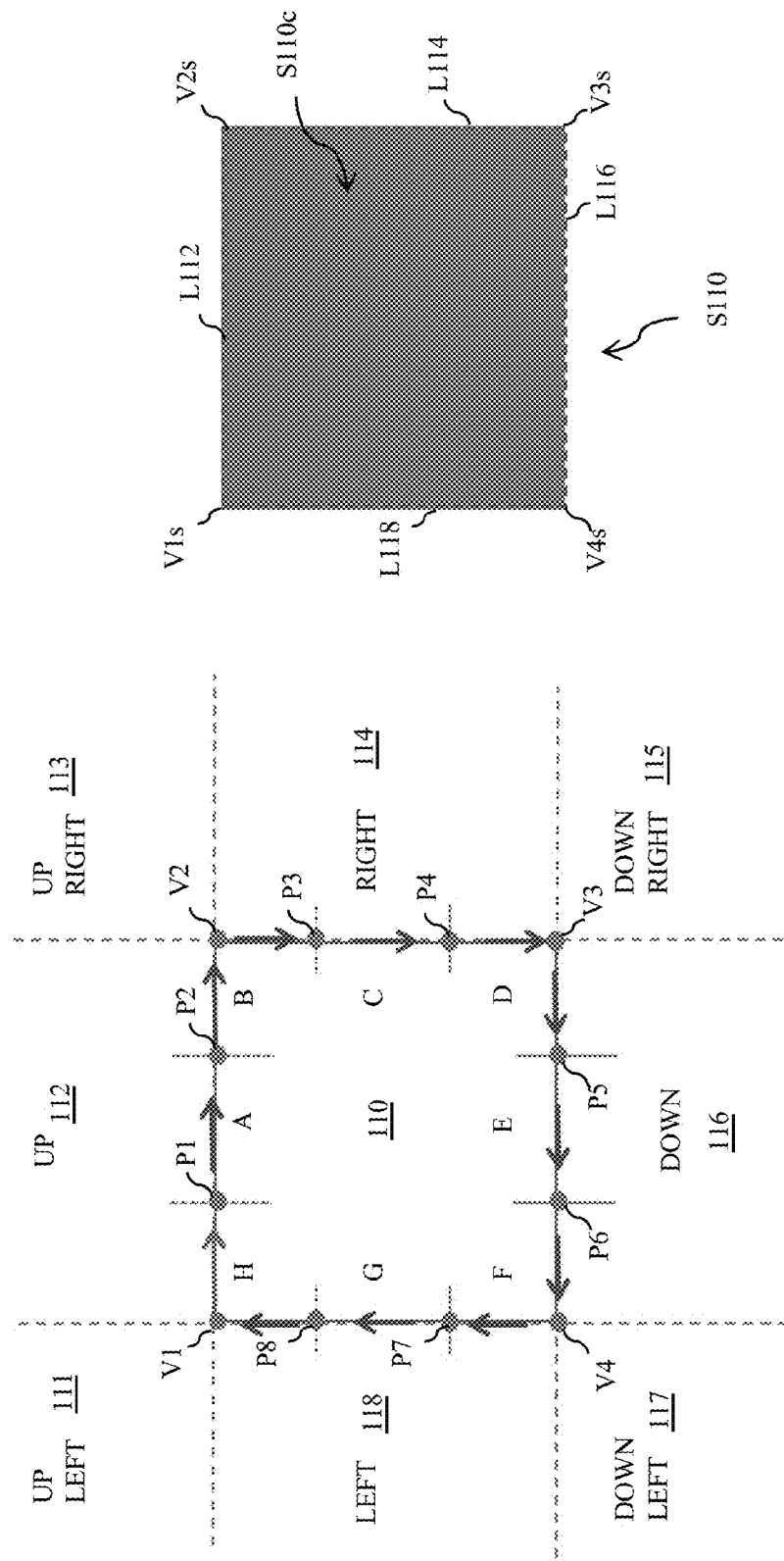
FIG. 11 schematically illustrates aspects of generating a silhouette for a square tile having all neighboring tiles being filled.

In FIG. 11, the tile configuration is represented by a central square tile 110 surrounded by eight filled neighboring tiles 111 through 118. To procedurally generate the silhouette, each section's corresponding neighbor tile can be characterized to determine whether it is filled or empty. The silhouette can be generated by creating a polygon corresponding to an outer contour of the silhouette by sequentially linking the connection nodes of each section having a corresponding neighboring tile with a filled status, and skipping one or more connection node(s) of each section having a corresponding neighboring tile with an empty status. Sequentially linking the connection nodes is performed clockwise in this example, though the same silhouette can be generated by sequentially linking the connection nodes in a counter-clockwise direction. In the example depicted in FIG. 11, since each section's corresponding neighboring tile is filled, all connection nodes are linked. For example, connection nodes V1, P1, P2 and V2 can be linked together by drawing a straight line between each pairs of connection nodes V1-P1, P1-P2 and P2-V2. This can create an edge L112 between vertexes V1s and V2s of the corresponding silhouette S110. Similarly, the other three edges L114, L116 and L118 of the silhouette S110 can be created between pairs of vertexes V2s-V3s, V3s-V4s, and V4s-V1s, respectively. Optionally, the created polygon can be filled with a pre-defined shading. As shown, the silhouette content S110c completely fills the silhouette S110. The contour of silhouette S110 indicates the corresponding tile 110 is not a part of the image border.

Figure 12:
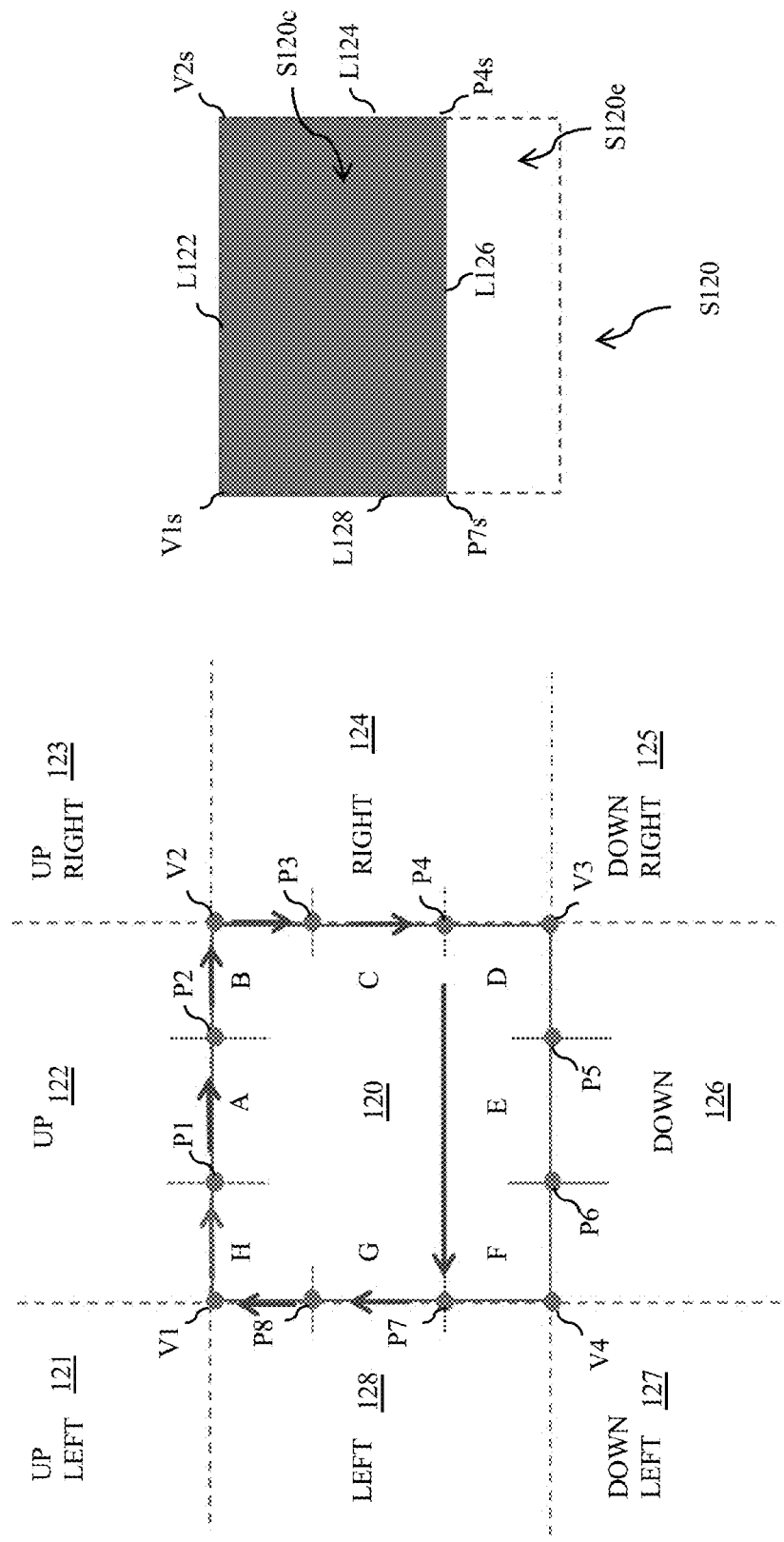
FIG. 12 schematically illustrates aspects of generating a silhouette for a square tile having three lower, neighboring tiles empty and the remaining five neighboring tiles filled.

In FIG. 12, the tile configuration is represented by a central square tile 120 surrounded by five filled neighboring tiles 121, 122, 123, 124, 128, and three empty neighboring tiles 125, 126, 127. Using a similar procedure as described above, the corresponding silhouette S120 can be generated. Note in this example, sections D, E and F are skipped. Thus, shortened edges L124 and L128 are created for the silhouette S120 by connecting nodes V2, P3 and P4, and nodes P7, P8 and V1, respectively. In addition, connecting nodes P4 and P7 by a straight line (i.e., skipping nodes V3, P5, P6 and V4) creates a lower edge L126 of the corresponding silhouette S120. As shown, the silhouette content S120c fills most of an upper part of the silhouette S120, while an empty space S120e is located in the remaining lower part of the tile containing the silhouette S120. The shape pattern of silhouette S120 indicates the corresponding tile 120 is a part of a lower border of an image.

Figure 13:
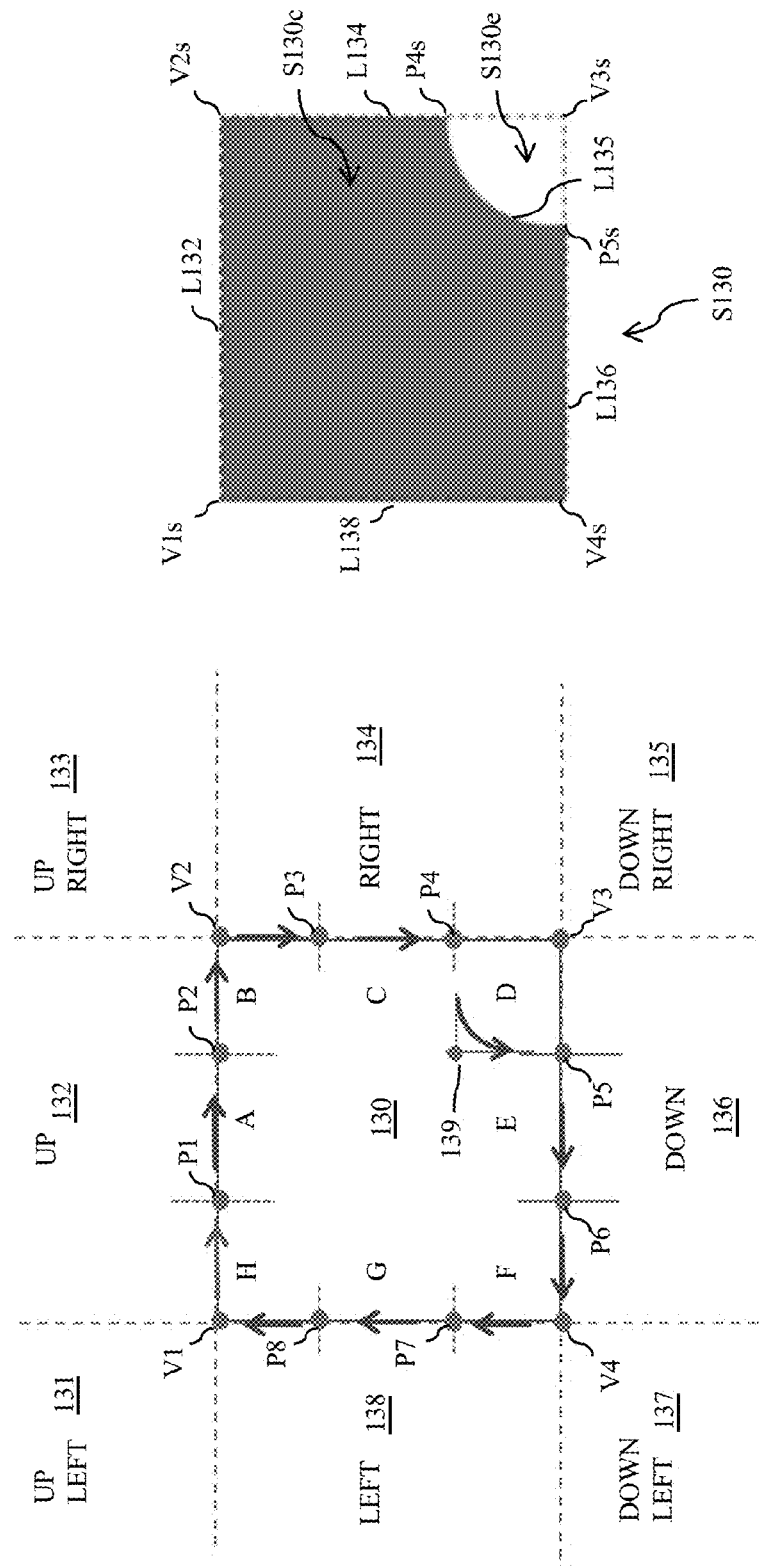
FIG. 13 schematically illustrates aspects of generating a silhouette for a square tile having all neighboring tiles filled except for one empty tile in the downward right position.

In FIG. 13, the tile configuration is represented by a central square tile 130 surrounded seven filled neighboring tiles 131-134 and 136-138, and one empty neighboring tile 135. Using a similar procedure as described above, the corresponding silhouette S130 can be generated. Note in this example, section D is skipped. Thus, shortened edges L134 and L136 are created for the silhouette S130 by connecting nodes V2, P3 and P4, and nodes P5, P6 and V4, respectively. Also as illustrated in this example, the line L135 linking the connection nodes (P4 and P5) around the skipped section D can be rounded. Of course, other contours are possible (curve, straight line, composite contours, etc.). This can be implemented, for example, by plotting a Bezier curve between the connection nodes P4 and P5, using a control point 139 determined by an intersection of lines passing through nodes P4 and P5, respectively, with those lines being perpendicular to the edges L134 and L136, respectively. The curve can extend from the end of the last filled section (e.g., node P4), and the start of the next filled section (e.g., node P5). As shown, an empty space S130e is located in the lower right corner while the silhouette content S130c fills the remaining area of the silhouette S130. The shape pattern of silhouette S130 indicates the corresponding tile 130 contains an image that is a part of a lower right border of an image.

Figure 14:
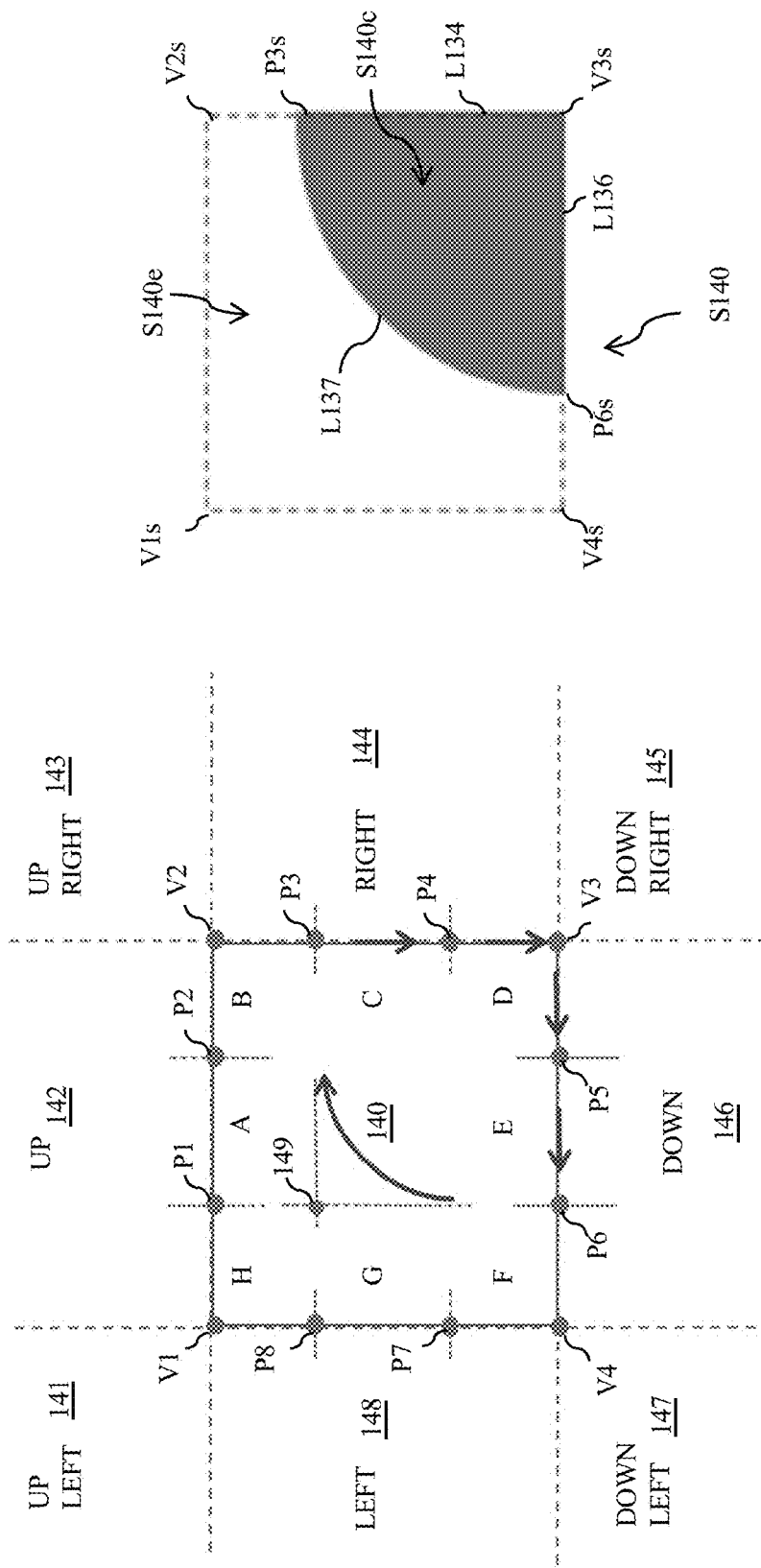
FIG. 14 schematically illustrates aspects of generating a silhouette for a square tile whose neighboring tiles all are empty except for three downward and right neighboring tiles being filled.

In FIG. 14, the tile configuration is represented by a central square tile 140 surrounded three filled neighboring tiles 144-146, and five empty neighboring tile 141-143 and 146-148. Using a similar procedure as described above, the corresponding silhouette S140 can be generated. Note in this example, sections A, B and F, G and H are skipped. Thus, shortened edges L134 and L136 are created for the silhouette S140 by connecting nodes P3, P4 and V3, and nodes V3, P5 and P6, respectively. Also as illustrated in this example, the line L137 linking the connection nodes (P6 and P3) around the skipped sections can be rounded. As above other contours are possible. This can be implemented, e.g., by plotting a Bezier curve between the connection nodes P6 and P3, using a control point 149 as described above. As shown, the silhouette content S140c fills the lower right corner of the silhouette S140, while an empty space S140e occupies the remaining area of the silhouette S140. The shape pattern of silhouette S140 indicates the corresponding tile 140 is a part of an upper-left border of an image.

Figure 15:
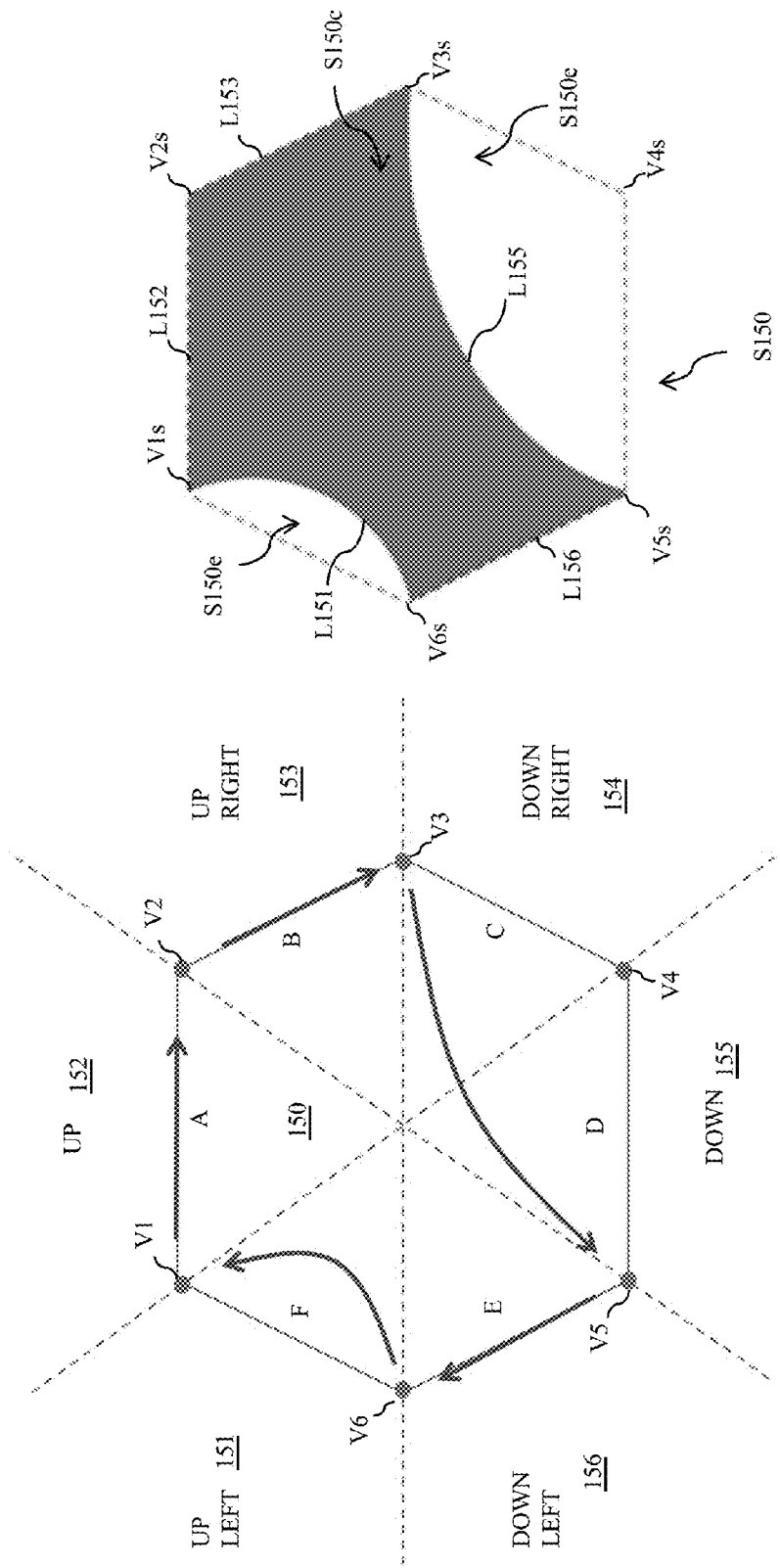
FIG. 15 schematically illustrates aspects of generating a silhouette for a hexagonal tile having several empty neighboring tiles and several filled neighboring tiles.

FIG. 15 shows another example of generating a silhouette, this time for a hexagonal tile. In this example, the tile configuration is represented by a central tile 150 surrounded three filled neighboring tiles 152, 153 and 156, and three empty neighboring tile 151, 154 and 155. For a hexagonal tile, since there is no vertex neighbor (i.e., all neighboring tiles are side neighbors), the edges of the perimeter do not need to be segmented to define corner sections. All connection nodes for a hexagonal tile V1 through V6 are vertices. As depicted in FIG. 15, each edge of the hexagon defines a corresponding section (A, B, C, D, E, F), each of which has a corresponding neighboring tile 152, 153, 154, 155, 156, 151. Using a similar procedure as described above, the corresponding silhouette S150 can be generated. Note in this example, sections C, D and F are skipped. Thus, for sections with filled neighboring tiles A, B and E, edges L152, L153 and L156 of the silhouette S150 have the same length as the respective edges of the tile 150. Also as illustrated in this example, the lines L155 and L151 linking the respective connection nodes (V3 and V5, V6 and V1) around the skipped sections can be rounded, similar to a process described above. As shown, two separate empty spaces S150e are created in this example, with one being in an upper left portion and the other in a lower right portion of the silhouette S150, while the silhouette content S150c occupies the remaining area of the silhouette S150. The shape pattern of silhouette S150 suggests the corresponding tile 150 is a part of an upper-left border, as well as a part of a lower-right border of an image.

Figure 16:
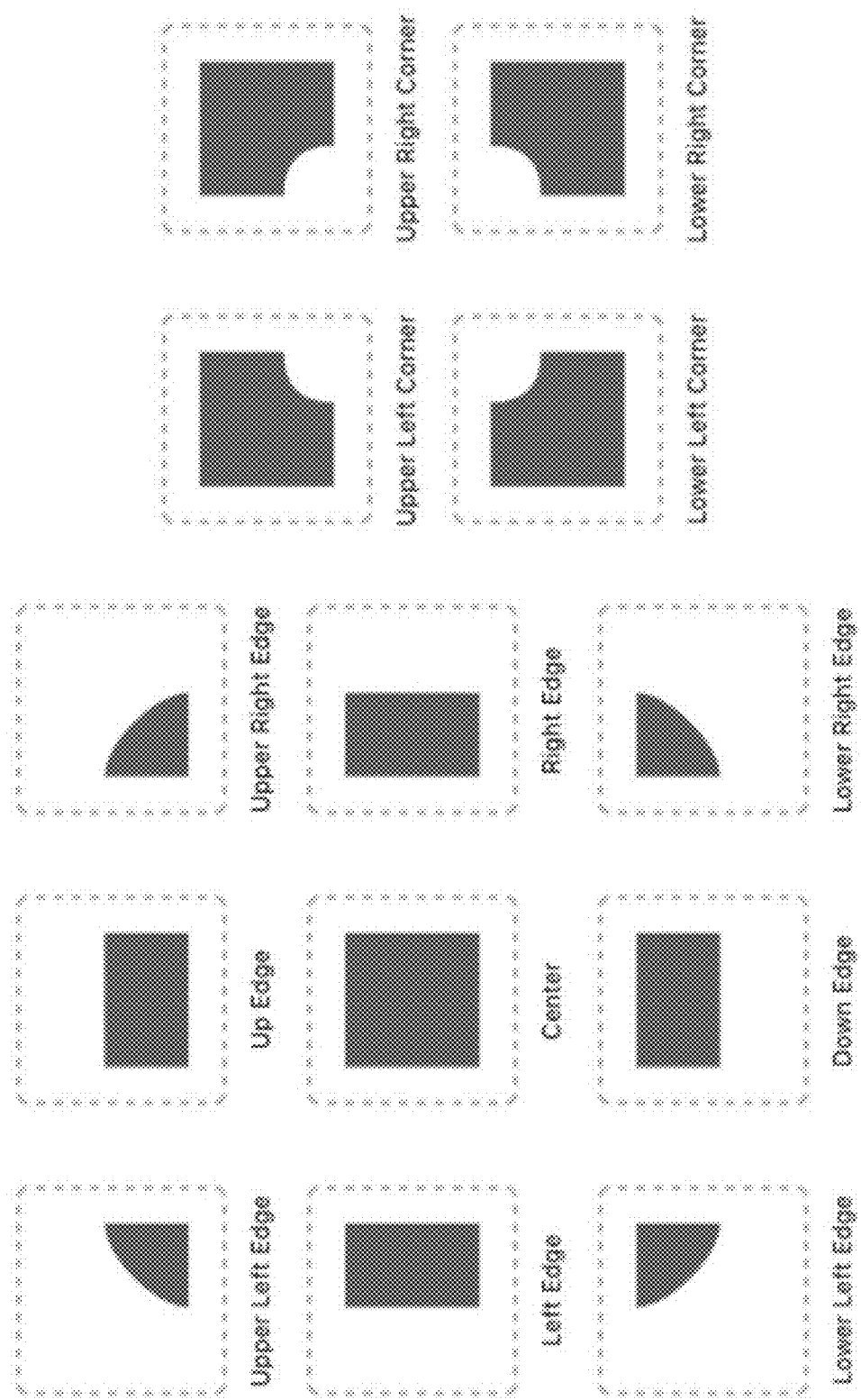
FIG. 16 shows a subset of possible silhouettes corresponding to a square central tile.
Figure 17:
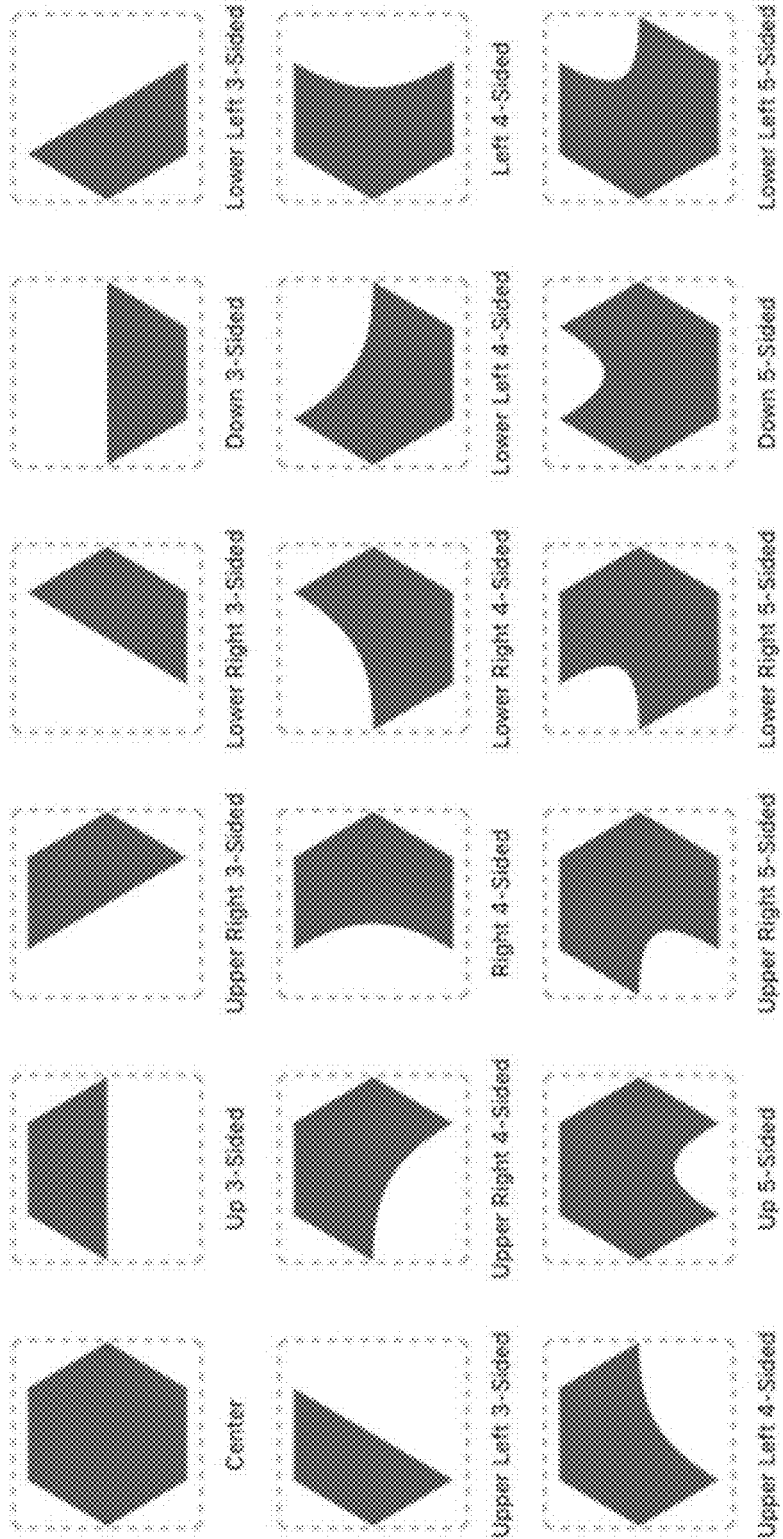
FIG. 17 shows a subset of possible silhouettes corresponding to a hexagonal central tile.
Figure 18:
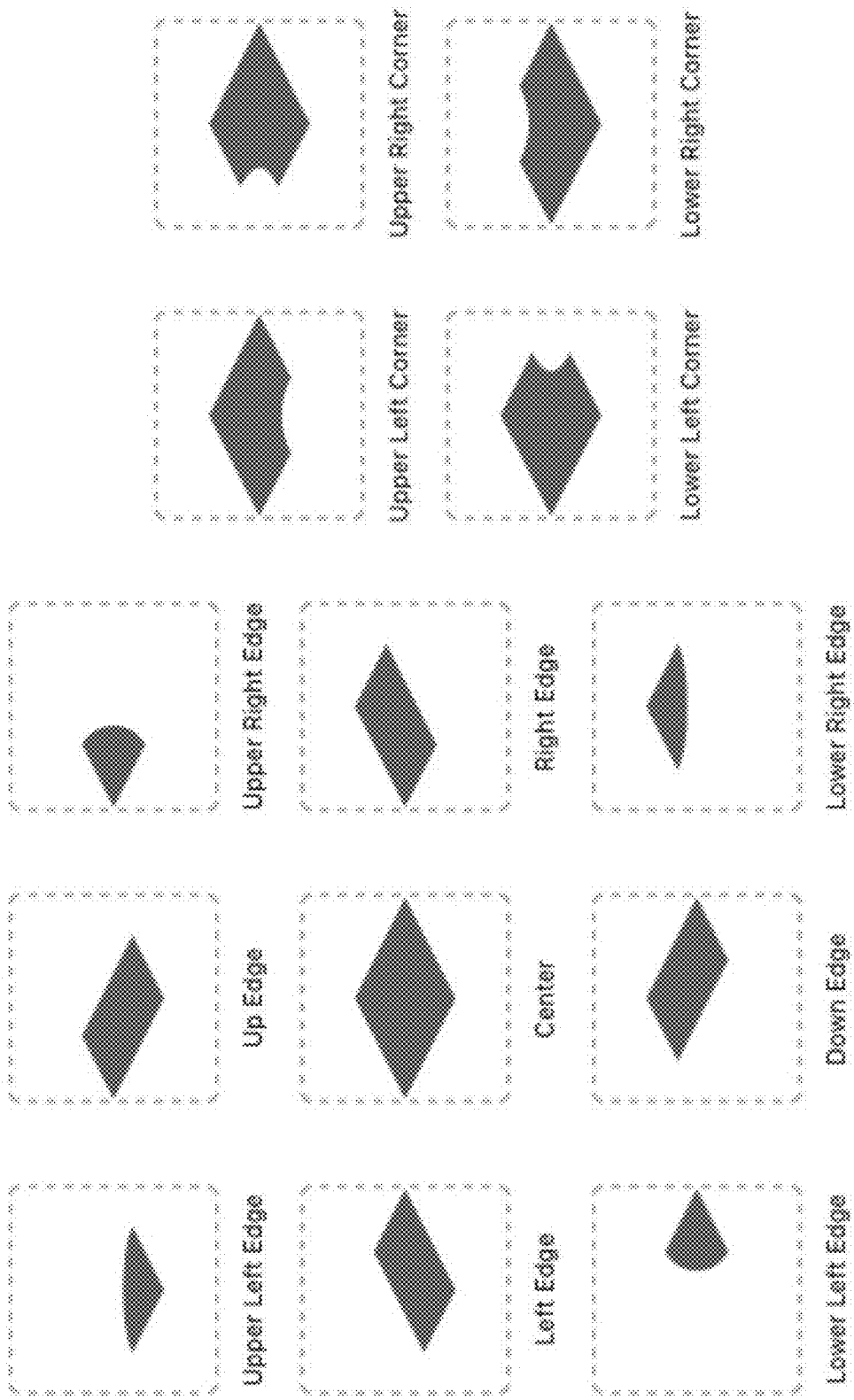
FIG. 18 shows a subset of possible silhouettes corresponding to an isometric central tile.

For purposes of illustration, FIG. 16 shows a subset of available silhouettes for square tiles, FIG. 17 shows a subset of silhouettes available for hexagonal tiles, and FIG. 18 shows a subset of available silhouettes for isometric tiles. As explained above, each silhouette can represent a distinct tile configuration. A complete set of silhouettes can represent many or even all available tile configurations in a given tile set before assembling the tile map.

VII. Shape Detector

Referring now to FIG. 25, a shape detector 2530 can analyze a shape of an image in a tile 2505 and can assign the tile 2505 to a tile slot 2535. More particularly, a position of each tile 2505 in relation to one or more neighboring tiles can be determined by the shape detector 2530, based on, for example, a position of a silhouette corresponding to the image in the tile in relation to one or more neighboring silhouettes within a set containing a plurality of silhouettes 2520. Each silhouette can have an associated tile slot 2535 for matching tiles, as well as, information on how the silhouette should be positioned relative to other silhouettes. After determining a position of each silhouette in relation to one or more neighboring silhouettes, the shape detector 2530 can assign a tile 2505 to the tile slot 2535 associated with the corresponding silhouette.

Correspondence between each respective tile and the corresponding silhouette can be based on a measure of concordance between the tile and the silhouette. As but one example, the content of a tile filled with an image can be represented by a plurality of underlying pixels in the tile the tile image (null for an empty tile). Thus, the tile content of a filled tile can characterize a geometric shape of the tile image. The content of a silhouette, e.g., a geometric shape of the silhouette image polygon, can be represented by an area covered by the silhouette within the template tile (null for an empty silhouette). For example, the area covered by the silhouette can be characterized by a number of pixels underlying the silhouette.

Figure 19:
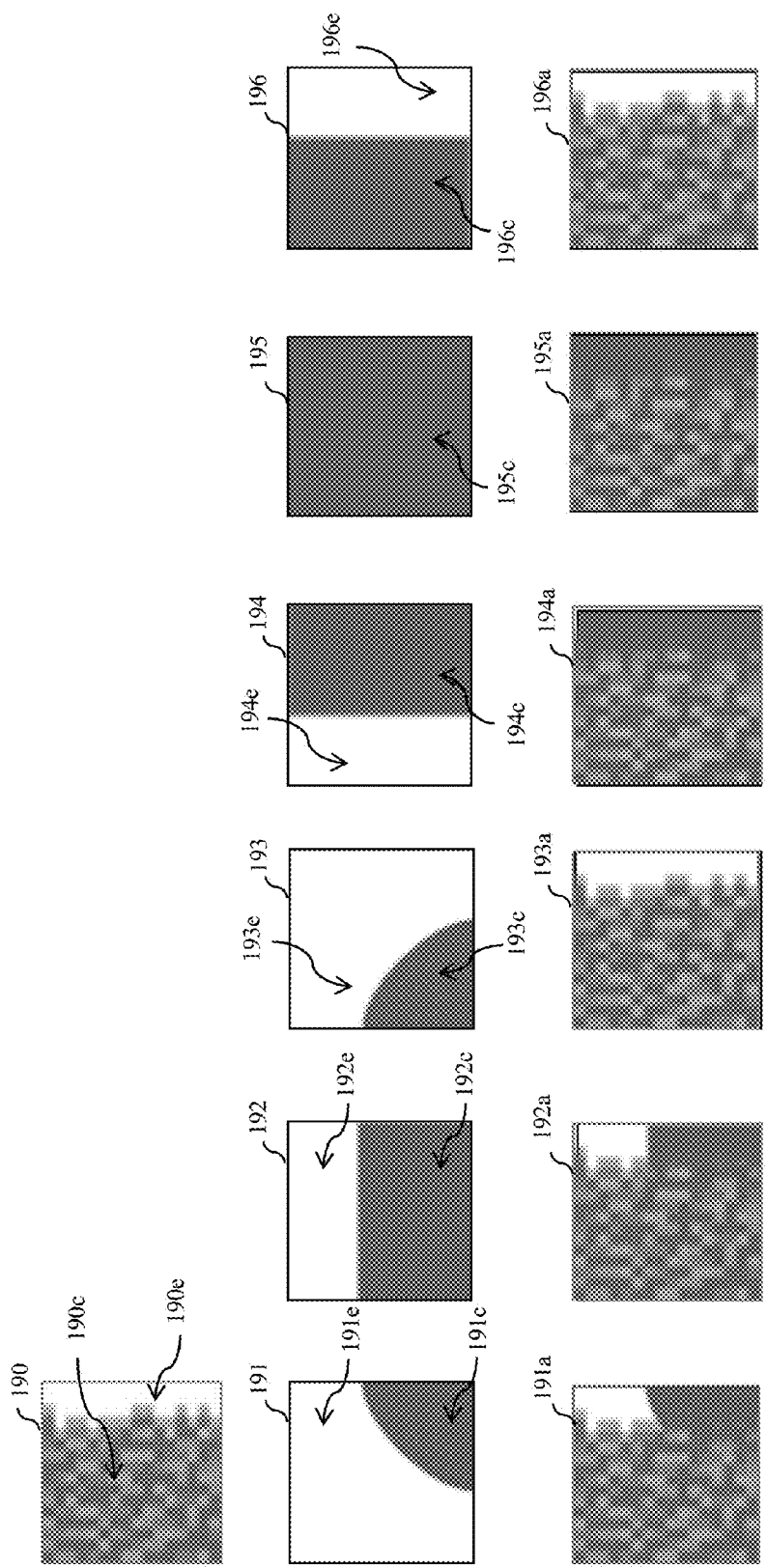
FIG. 19 schematically illustrates aspects of defining a silhouette for a tile corresponding to an image within the tile.

FIG. 19 illustrates aspects of measuring concordance between a tile image and a silhouette image. In this example, an input tile 190 has an image 190c predominantly located on the left side of the tile. In other words, the tile content 190c is located on the left side, and a band of empty space 190e is located on the right side of the tile 190. For illustration purposes, the input tile 190 is compared to six different silhouettes 191 through 196 only 6 out of 256 silhouettes in the set of silhouette corresponding to the square-shaped tile are shown for purposes of illustration. FIG. 19 shows silhouette content (e.g., 191c, 192c, 193c, 194c, 195c and 196c and empty space 191e, 192e, 193e, 194e and 196e) for each silhouette where silhouette 195 has no empty space. The bottom row of images depicts the input tile image 190c overlying the respective silhouette, shown as 191a through 196a. The silhouette having the highest measure of concordance with the input tile image can be selected as the tile's corresponding silhouette, and that silhouette can be determined to be a match for the tile image. In this example, the highest measure of concordance is obtained between tile 190 and silhouette 196, for the shape pattern of silhouette 196 mostly matches that of the tile 190 compared to other considered silhouettes. For example, as compared to silhouettes 191 through 195, silhouette 196 has a highest percentage of pixels having non-null valves corresponding to pixels in the tile 190 having non-null valves. Stated differently, the silhouette content 196c and empty space 192e have the highest concordance with the tile content 190c and empty space 190e as measured by pixel-to-pixel correspondence between the tiles. Thus, silhouette 196 is determined to be the corresponding silhouette for the input tile 190, and the tile 190 is determined to be a matching tile for the silhouette 196.

There are many different measures of concordance between a tile and a silhouette. One exemplary, but non-exclusive, measure is a ratio of concordant pixel count (CPC) to the total pixel count within the tile (TPC). Since the tile size is fixed, TPC is a constant. The CPC can be calculated by comparing each pixel in the tile with the corresponding pixel in the silhouette. For example, each pixel in tile 190 can have a corresponding pixel in a respective silhouette (191 through 196) in that the pixels can have the same coordinates, as depicted in 191a through 196a where the tile 190 overlies the respective silhouette (191 through 196). The CPC can be incremented by one if a pixel in the tile underlies the tile image (inside the tile content 190c) and the corresponding pixel in the respective silhouette also underlies the silhouette image (inside the respective silhouette content, e.g., 191c, 192c, 193c, 194c, 195c and 196c). The CPC can also be incremented by one if a pixel in the tile is outside the tile image (inside the empty space 190e) and the corresponding pixel in the respective silhouette is also outside the silhouette image (inside the respective empty space, e.g., 191e, 192e, 193e, 194e and 196e). Thus, the CPC, as well as the CPC/TPC ratio measures a degree of overlap (or matching) between the tile and the silhouette if one overlies the other. Other approaches for measuring the concordance between a tile and a silhouette are contemplated, for example, by converting the empty space of the tile and silhouette to zero values and converting the content portion of the tile and silhouette to non-zero values, and then calculating a correlation coefficient between the converted tile and the converted silhouette.

For each tile in the collection of input tiles, its relation to one or more neighboring tiles can be analyzed by comparing the tile to each silhouette in the set of silhouettes. After the tile is compared with all of the silhouettes in the set, its corresponding silhouette can be identified. Moreover, the tile can be determined to be a matching tile for the corresponding silhouette, and can be assigned to the tile slot associated with the corresponding silhouette.

Figure 20:
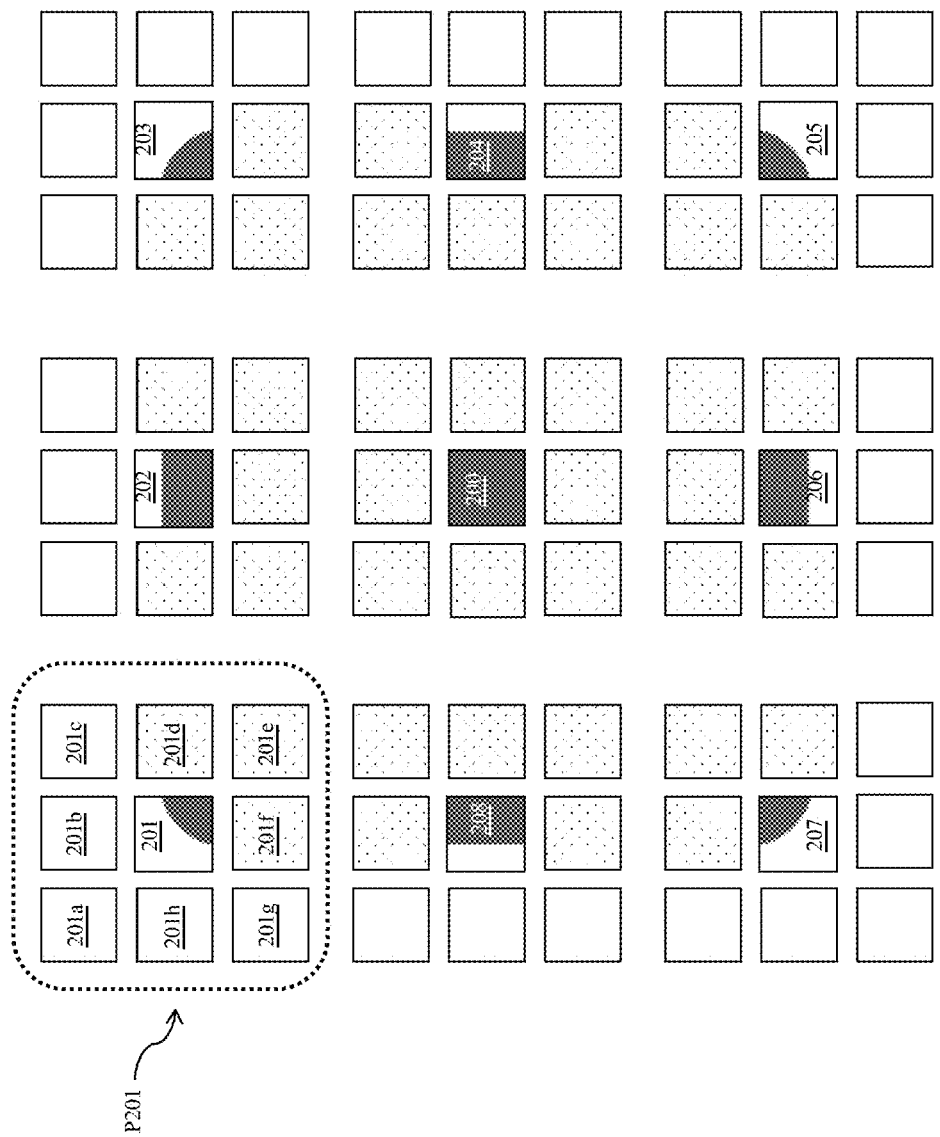
FIG. 20 shows a silhouette corresponding to each square tile in FIG. 6A, together with a respective plurality of neighboring tiles being filled (shown in dotted fill pattern) or empty (shown in blank).

As described above (see also FIGS. 7A-7D and corresponding descriptions) and further illustrated in FIG. 20, each silhouette (200 through 208) can correspond to a distinct spatial pattern of filled and/or empty neighboring tiles surrounding a central tile. For example, silhouette 201 corresponds to a distinct spatial pattern P201, which is characterized by a central silhouette 201 (and its matching tiles) surrounded by three filled neighboring tiles 201d, 201e and 201f, and five empty neighboring tiles 201a, 201b, 201c, 201g and 201h. The spatial pattern P201 indicates each matching tile of silhouette 201 is a part of an upper-left border of an image.

The spatial pattern of a silhouette can be used to generate rules that govern how tiles should be placed relative to each other when assembling a tile map. Such rules can be implemented or used in a computing environment to assemble one or more groups of tiles in a given tile set. For example, referring to FIG. 20, a rule can be generated that requires silhouette 201 to have a right-side filled neighbor 201d. Accordingly, another rule can be generated that requires a silhouette being eligible to be the right-side neighbor 201d of silhouette 201 must have a left-side filled neighbor. Thus, silhouettes 200, 202, 203, 204, 205, and 206 are eligible matches in the right-side tile 201d, but silhouettes 201, 207 and 208 are not eligible to be the right-side neighbor 201d of silhouette 201. Additional rules can be similarly generated that governs other side or vertex neighbors of the silhouette 201. Following a similar approach for each silhouette in the set of silhouettes, a plurality of rules can be generated that govern how different silhouettes should be placed relative to each other. These rules can be used by the computing environment to assemble the tile map.

Accordingly, the tile slot associated with each silhouette conveys position information (e.g., a positional relationship between neighboring tiles) useful to piece input tiles together. When an input tile is assigned to one of the corresponding tile slots, it gets associated with the position information allowing it to be placed it in a tile map.

VIII. Tile Map Assembler

As illustrated in FIG. 25, the tile map assembler 2500 receives a plurality, or a collection of input tiles 2505 to assemble a tile map. Processed by a color detector unit 2540, each tile in the plurality of tiles can be assigned to a plurality of one or more color groups 2545 in correspondence with a measure of a color profile of the respective tile. The position of each tile in relation to one or more neighboring tiles can be determined by a shape detector 2510, based on the position of a corresponding silhouette in relation to one or more neighboring silhouettes within a set containing a plurality of silhouettes 2520. Each silhouette approximately outlines a geometric shape of a tile image (or tile content), and characterizes the tile's position in relation to one or more neighboring tiles. As described above, the set of silhouettes can be generated on-demand, or pre-generated by a silhouette generator 2510 based on a tileshare, as described above. Both silhouette generator 2510 and the generated silhouette set 2520 can be incorporated in the tile map assembler 2500, or can be a separate module in communication with the tile map assembler 2500. Each silhouette has an associated tile slot 2535. After determining the position of each tile in relation to one or more neighboring tiles, or the slot, the shape detector 2530 assigns each respective tile in the set of tiles to a corresponding silhouette having a given tile slot 2535. Then, the position of each tile relative to the other tiles in the tile map 2555 can be determined by an assembling unit 2550, based on the color group 2545 to which the respective tile belongs and the determined position of the respective tile in relation to the one or more neighboring tiles. The tile map 2555 can be assembled when the position of each tile in the set of plurality of tiles is determined. The assembled tile map 2555 can be stored in a memory location of a computing environment for later retrieval, or transmitted to another device, or rendered as a 2D graphic in a display device.

Figure 22:
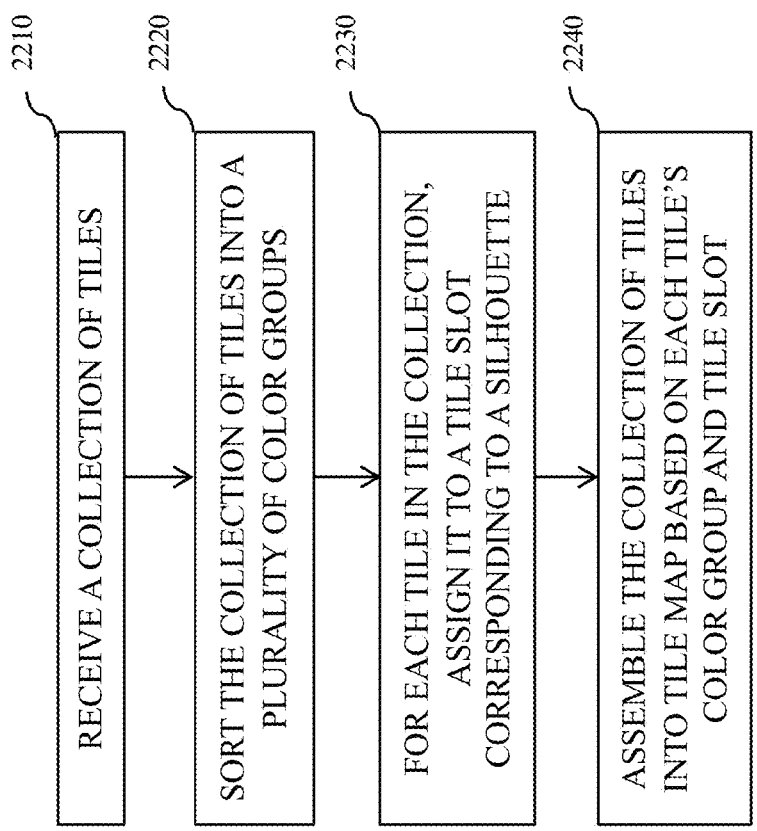
FIG. 22 shows a block diagram of a process for assembling a tile map.

Referring now to FIG. 22, after receiving a plurality of tiles in step 2210, in step 2220, each tile in the plurality of tiles can be assigned to a plurality of one or more color groups in correspondence with a measure of a color profile of the respective tile. In step 2230, the position of each tile in relation to one or more neighboring tiles can be determined based on the position of a corresponding silhouette in relation to one or more neighboring silhouettes within a set containing a plurality of silhouettes, and the tile can be assigned to a tile slot associated with the corresponding silhouette. At step 2240, a tile map can be assembled by determining a position of each tile based on the color group to which the respective tile belongs and the determined position of the respective tile in relation to the one or more neighboring tiles.

IX. Assembling Unit

Referring again to FIG. 25, when each of the input tiles 2505 has been assigned to a corresponding tile slot 2535 and color group 2545, the corresponding silhouette's positional information as well as the color profile information can be used by the assembling unit 2550 to automatically determine a tile position in the tile map 2555, in some instances without requiring any additional interaction.

Figure 21:
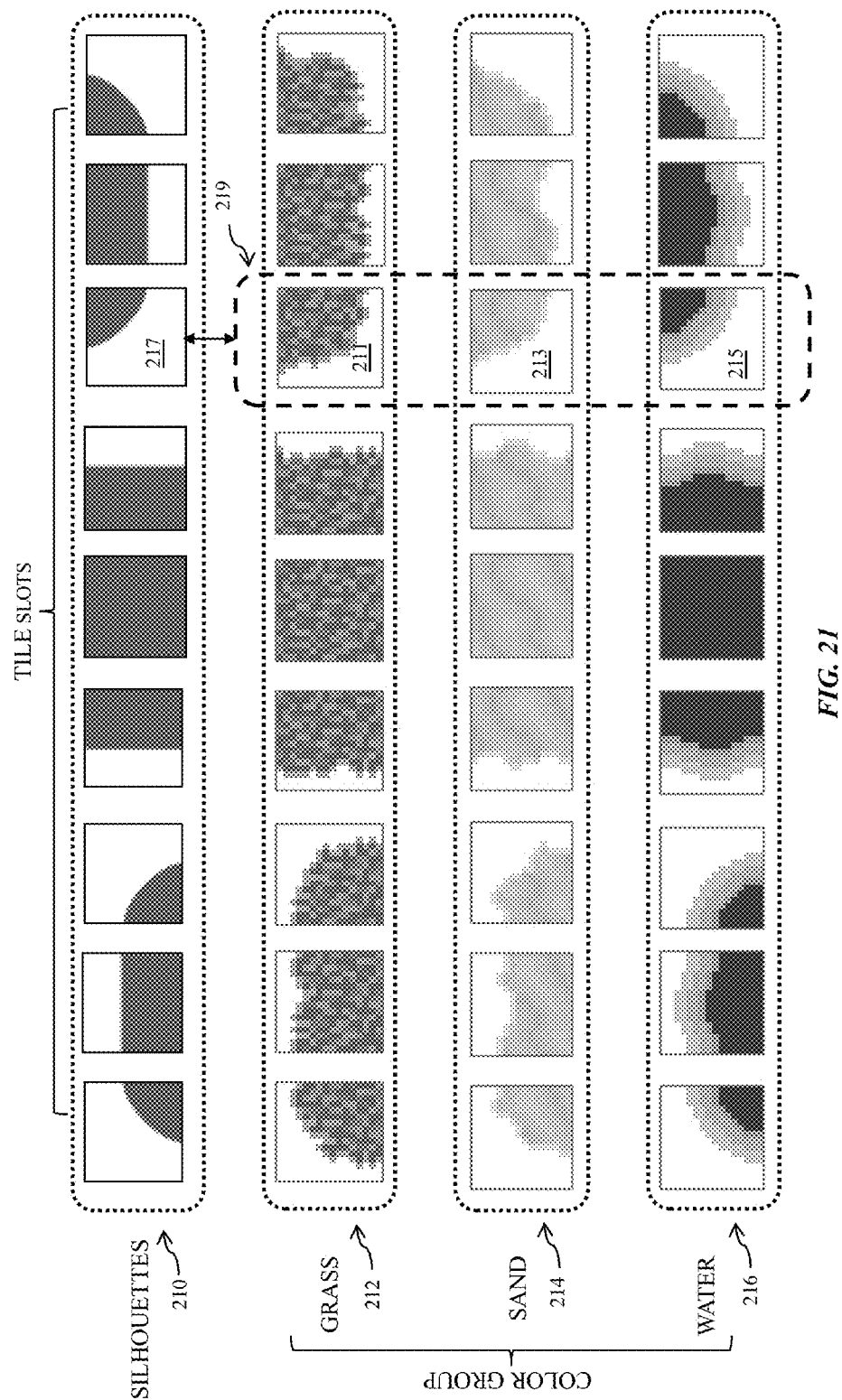
FIG. 21 shows several arrays of tile images sorted into selected color groups, as well as different tile slots with corresponding silhouettes.

For example, FIG. 21 shows a tile set including 27 input tiles that can be sorted into three color groups: group 212 includes green tiles representing grass, group 214 includes brown tiles representing sand, and group 216 includes blue tiles representing water. The tiles can also be assigned to one of nine tile slots corresponding to nine exemplary silhouettes 210. In this example, each tile slot, as determined by a give silhouette tile, contains three input tiles having similar shape of tile content but representing different scenes (grass, sand, and water). For example, tile slot 219 includes three tiles 211, 213 and 215. Each of these three tiles has a different color profile (e.g., tile 211 belongs to color group 212, tile 213 belongs to color group 214, and tile 215 belongs to color group 216), but all of these tiles correspond to silhouette 217. Thus, input tiles belonging to the same color group can be assembled together to represent a specific scene or object, and the spatial arrangement of these input tiles can be determined based on the positional information contained in the corresponding silhouette tile slots.

With each tile's position in the tile map being determined by the assembling unit 2550, the time map assembler 2500 can automatically assemble the collection of tiles 2505 to the tile map 2555, which can be stored in a memory location of a computing environment for later retrieval, or transmitted to another device, or rendered as a 2D graphic in a display device.

X. Computing Environments

Figure 26:
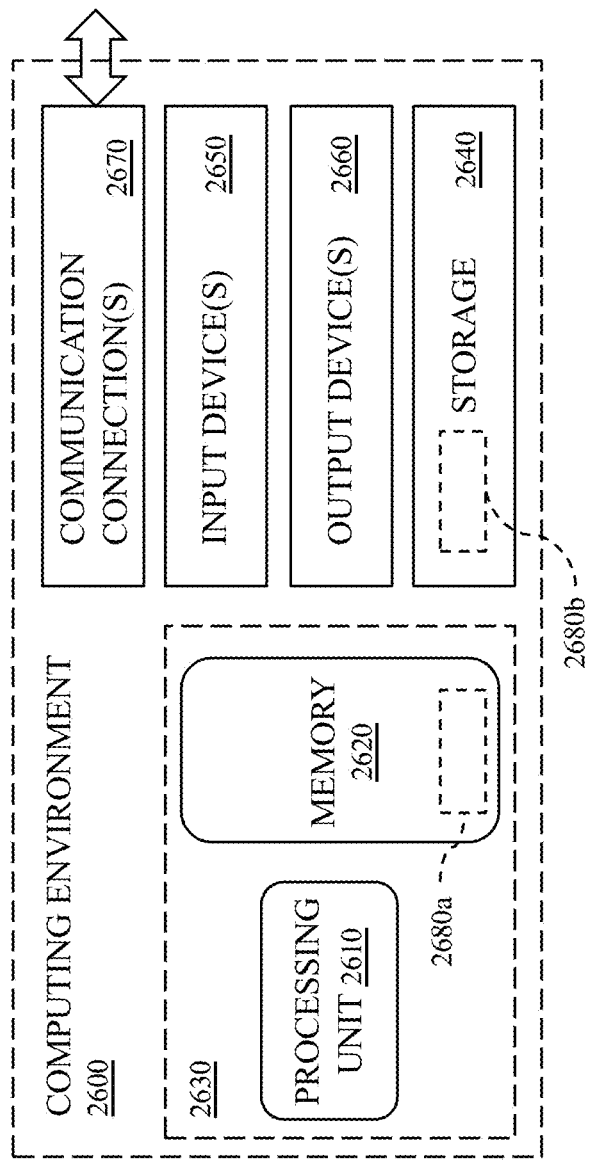
FIG. 26 shows a schematic block diagram of a computing environment suitable for implementing one or more technologies disclosed herein.

FIG. 26 illustrates a generalized example of a suitable computing environment 2600 in which described methods, embodiments, techniques, and technologies relating, for example, to tile-map-assembling can be implemented. The computing environment 2600 is not intended to suggest any limitation as to scope of use or functionality of the technologies disclosed herein, as each technology may be implemented in diverse general-purpose or special-purpose computing environments. For example, each disclosed technology may be implemented with other computer system configurations, including wearable and handheld devices (e.g., a mobile-communications device, or, more particularly but not exclusively, IPHONE®/IPAD® devices, available from Apple Inc. of Cupertino, Calif.), multiprocessor systems, microprocessor-based or programmable consumer electronics, embedded platforms, network computers, minicomputers, mainframe computers, smartphones, tablet computers, video game consoles, game engines, video TVs, and the like. Each disclosed technology may also be practiced in distributed computing environments where tasks are performed by remote processing devices that are linked through a communications connection or network. In a distributed computing environment, program modules may be located in both local and remote memory storage devices.

The computing environment 2600 includes at least one central processing unit 2610 and memory 2620. In FIG. 26, this most basic configuration 2630 is included within a dashed line. The central processing unit 2610 executes computer-executable instructions and may be a real or a virtual processor. In a multi-processing system, multiple processing units execute computer-executable instructions to increase processing power and as such, multiple processors can run simultaneously. The memory 2620 may be volatile memory (e.g., registers, cache, RAM), non-volatile memory (e.g., ROM, EEPROM, flash memory, etc.), or some combination of the two. The memory 2620 stores software 2680a that can, for example, implement one or more of the innovative technologies described herein, when executed by a processor.

A computing environment may have additional features. For example, the computing environment 2600 includes storage 2640, one or more input devices 2650, one or more output devices 2660, and one or more communication connections 2670. An interconnection mechanism (not shown) such as a bus, a controller, or a network, interconnects the components of the computing environment 2600. Typically, operating system software (not shown) provides an operating environment for other software executing in the computing environment 2600, and coordinates activities of the components of the computing environment 2600.

The storage 2640 may be removable or non-removable, and can include selected forms of machine-readable media. In general machine-readable media includes magnetic disks, magnetic tapes or cassettes, non-volatile solid-state memory, CD-ROMs, CD-RWs, DVDs, magnetic tape, optical data storage devices, and carrier waves, or any other machine-readable medium which can be used to store information and which can be accessed within the computing environment 2600. The storage 2640 stores instructions for the software 2680*b*, which can implement technologies described herein.

The storage 2640 can also be distributed over a network so that software instructions are stored and executed in a distributed fashion. In other embodiments, some of these operations might be performed by specific hardware components that contain hardwired logic. Those operations might alternatively be performed by any combination of programmed data processing components and fixed hardwired circuit components.

The input device(s) 2650 may be a touch input device, such as a keyboard, keypad, mouse, pen, joystick, touchscreen, touch pad, or trackball, a voice input device, a hand gesture recognition device, a scanning device, a microphone or other sound transducer, or another device, that provides input to the computing environment 2600. The output device(s) 2660 may be a display, printer, speaker, CD-writer, or another device that provides output from the computing environment 2600.

The communication connection(s) 2670 enable wired or wireless communication over a communication medium (e.g., a connecting network) to another computing entity. The communication medium conveys information such as computer-executable instructions, compressed graphics information, or other data in a modulated data signal.

Tangible machine-readable media are any available, tangible media that can be accessed within a computing environment 2600. By way of example, and not limitation, with the computing environment 2600, computer-readable media include memory 2620, storage 2640, communication media (not shown), and combinations of any of the above. Tangible computer-readable media exclude transitory signals.

XI. Other Embodiments

The examples described above generally concern tile-map-assembling systems and related methods. Nonetheless, embodiments other than those described above in detail are contemplated based on the principles disclosed herein, together with any attendant changes in configurations of the respective system and methods described herein.

Directions and other relative references, e.g., up, down, left, right, up left, up right, down left, down right, top, bottom, etc., may be used to facilitate discussion of the drawings and principles herein, but are not intended to be limiting. For example, certain terms may be used such as "up," "down,", "upper," "lower," "horizontal," "vertical," "left," "right," "top", "bottom", and the like. Such terms are used, where applicable, to provide some clarity of description when dealing with relative relationships, particularly with respect to the illustrated embodiments. Such terms are not, however, intended to imply absolute relationships, positions, and/or orientations. For example, with respect to an object, an "upper" part can become a "lower" part simply by turning the object over. Nevertheless, it is still the same surface and the object remains the same. As used herein, "and/or" means "and" or "or", as well as "and" and "or."

Moreover, all patent and non-patent literature cited herein is hereby incorporated by reference in its entirety for all purposes.

The principles described above in connection with any particular example can be combined with the principles described in connection with another example described herein. Accordingly, this detailed description shall not be construed in a limiting sense, and following a review of this disclosure, those of ordinary skill in the art will appreciate the wide variety of signal processing techniques that can be devised using the various concepts described herein.

Moreover, those of ordinary skill in the art will appreciate that the exemplary embodiments disclosed herein can be adapted to various configurations and/or uses without departing from the disclosed principles. Applying the principles disclosed herein, it is possible to provide a wide variety of systems adapted to assemble tile maps based on a set of tiles. For example, modules identified as constituting a portion of a given computational engine in the above description or in the drawings can be omitted altogether or implemented as a portion of a different computational engine without departing from some disclosed principles. Moreover, 2D graphic rendering other than assembling tile maps for video games can be interpreted using principles disclosed herein.

The previous description of the disclosed embodiments is provided to enable any person skilled in the art to make or use the disclosed innovations. Various modifications to those embodiments will be readily apparent to those skilled in the art, and the generic principles defined herein may be applied to other embodiments without departing from the spirit or scope of this disclosure. Thus, the claimed inventions are not intended to be limited to the embodiments shown herein, but are to be accorded the full scope consistent with the language of the claims, wherein reference to an element in the singular, such as by use of the article "a" or "an" is not intended to mean "one and only one" unless specifically so stated, but rather "one or more". All structural and functional equivalents to the features and method acts of the various embodiments described throughout the disclosure that are known or later come to be known to those of ordinary skill in the art are intended to be encompassed by the features described and claimed herein. Moreover, nothing disclosed herein is intended to be dedicated to the public regardless of whether such disclosure is explicitly recited in the claims. No claim element is to be construed under the provisions of 35 USC 112, sixth paragraph, unless the element is expressly recited using the phrase "means for" or "step for".

Thus, in view of the many possible embodiments to which the disclosed principles can be applied, we reserve to the right to claim any and all combinations of features and technologies described herein as understood by a person of ordinary skill in the art, including, for example, all that comes within the scope and spirit of the following claims.

We currently claim:

1. A method of automatically assembling a tile map, the method comprising:
    assigning each tile in a plurality of tiles to one or more color groups in correspondence with a measure of a color profile of the respective tile;
    accessing a set of silhouettes corresponding to the plurality of tiles, wherein each tile corresponds to a selected silhouette among the set of silhouettes;
    determining a position of each of the respective tiles in relation to one or more neighboring tiles based on a position of the silhouette corresponding to the respective tile in relation to the silhouette corresponding to each of the one or more neighboring tiles; and assembling the plurality of tiles into a tile map, wherein a position of each tile in the tile map is determined in correspondence to the color group to which each respective tile belongs and the determined position of each respective tile in relation to the one or more neighboring tiles.

2. The method according to claim 1, wherein correspondence between each respective tile and the corresponding silhouette is based on a measure of concordance between the respective tile and the corresponding silhouette.

3. The method according to claim 1, wherein the act of determining a position of each of the respective tiles in relation to one or more neighboring tiles comprises comparing each respective tile to each silhouette in the set of silhouettes.

4. The method according to claim 3, wherein the act of determining a position of each of the respective tiles in relation to one or more neighboring tiles further comprises assigning each respective tile to a corresponding silhouette based on a measure of correspondence between the tile and the silhouette.

5. The method according to claim 4, wherein the measure of correspondence is based on a measure of concordance between the tile and the silhouette.

6. The method according to claim 1, further comprising selecting the set of silhouettes based at least in part on a shape of the tiles in the plurality of tiles.

7. The method according to claim 1, wherein the act of accessing the set of silhouettes comprises generating a corresponding set of silhouettes for each of one or more tile shapes.

8. The method according to claim 7, wherein the act of generating a corresponding set of silhouettes comprises:
defining a respective central silhouette tile having a shape corresponding to each of the one or more tile shapes;
identifying one or more neighboring silhouette tiles in relation to each respective central silhouette tile;
assigning each neighboring silhouette tile a filled status or an empty status, and permuting the filled status and the empty status for each neighboring silhouette tile to define a plurality of combinations of neighboring silhouette tiles having a filled status, an empty status, or a combination thereof; and
generating a silhouette of each respective central silhouette tile corresponding to each combination of neighboring silhouette tiles having the filled status, the empty status, or the combination thereof.

9. The method according to claim 8, wherein the act of generating a silhouette of each respective central silhouette tile comprises:
dividing a perimeter of the respective central silhouette tile into a plurality of sequentially connected sections, wherein each section comprises at least one line segment extending between two or more connection nodes, and wherein each section has a corresponding neighboring silhouette tile; and
sequentially linking the connection nodes of each section having a corresponding neighboring silhouette tile with a filled status, and skipping each section having a corresponding neighboring silhouette tile with an empty status to generate a perimeter of the silhouette of the central silhouette tile.

10. The method according to claim 9, wherein the act of dividing the perimeter of the respective central silhouette tile further comprises dividing each edge of the perimeter.

11. The method according to claim 9, wherein the act of linking the connection nodes further comprises drawing a straight line between adjacent linked connection nodes and drawing a curved line between linked connection nodes juxtaposed with one or more skipped connection nodes.

12. The method according to claim 11, wherein the curved line comprises a Bezier curve.

13. The method according to claim 1, wherein each tile has a shape comprising a selected one or more of a square, a rectangle, a triangle, a parallelogram, and a hexagon.

14. The method according to claim 1, wherein the color profile of each respective tile comprises one or more of a color, a shade, a fill pattern, a hue, a saturation, a lightness, and an alphas transparency.

15. A non-transitory, computer readable media comprising instructions that, when executed by a computing environment, cause the computing environment to perform a method for automatically assembling a tile map, the method comprising:
assigning each tile in a plurality of tiles to one or more color groups in correspondence with a measure of a color profile of the respective tile;
accessing a set of silhouettes corresponding to the plurality of tiles, wherein each tile corresponds to a selected silhouette among the set of silhouettes;
determining a position of each of the respective tiles in relation to one or more neighboring tiles based on a position of the silhouette corresponding to the respective tile in relation to the silhouette corresponding to each of the one or more neighboring; and
assembling the plurality of tiles into a tile map, wherein a position of each tile in the tile map is determined in correspondence to the color group to which each respective tile belongs and the determined position of each respective tile in relation to the one or more neighboring tiles.

16. The non-transitory computer readable media according to claim 15, wherein the act of determining a position of each of the respective tiles in relation to one or more neighboring tiles comprises assigning each respective tile to a corresponding silhouette based on a measure of correspondence between the tile and the silhouette.

17. The non-transitory computer readable media according to claim 15, wherein the method further comprises:
defining a respective central silhouette tile having a shape corresponding to each of the one or more tile shapes;
identifying one or more neighboring silhouette tiles in relation to each respective central silhouette tile;
assigning each neighboring silhouette tile a filled status or an empty status, and permuting the filled status and the empty status for each neighboring silhouette tile to define a plurality of combinations of neighboring silhouette tiles having a filled status, an empty status, or a combination thereof; and
generating a silhouette of each respective central silhouette tile corresponding to each combination of neighboring silhouette tiles having the filled status, the empty status, or the combination thereof.

18. The non-transitory computer readable media according to claim 17, wherein the act of generating a silhouette of each respective central silhouette tile comprises:
dividing a perimeter of the respective central silhouette tile into a plurality of sequentially connected sections, wherein each section comprises at least one line segment extending between two or more connection nodes, and wherein each section has a corresponding neighboring silhouette tile; and sequentially linking the connection nodes of each section having a corresponding neighboring silhouette tile with a filled status, and skipping each section having a corresponding neighboring silhouette tile with an empty status to generate a perimeter of the silhouette of the central silhouette tile.

19. A non-transitory, computer readable media comprising instructions that, when executed, cause a computing environment to perform a method to provide a corresponding set of silhouettes for each of a plurality of tile shapes, the method comprising:

receiving over a communication connection the plurality of tile shapes;

generating a central silhouette tile having each respective shape;

identifying one or more neighboring silhouette tiles in relation to each respective central silhouette tile;

assigning each neighboring silhouette tile a filled status or an empty status, and permuting the filled status and the empty status for each neighboring silhouette tile in relation to each respective central silhouette tile to define a plurality of combinations of neighboring silhouette tiles having the filled status, the empty status, or a combination thereof;

generating a silhouette of each respective central silhouette tile corresponding to each combination of neighboring silhouette tiles having the filled status, the empty status, or the combination thereof; and transmitting over the communication connection the generated silhouettes.

20. The non-transitory computer readable media according to claim 19, wherein the act of generating a silhouette of each respective central silhouette tile comprises:

dividing a perimeter of the respective central silhouette tile into a plurality of sequentially arranged sections, wherein each section comprises at least one line segment extending between two or more corresponding connection nodes, and wherein each section has a corresponding neighboring silhouette tile; and sequentially linking the respective connection nodes of each section having a corresponding neighboring tile with a filled status, and skipping a connection node of each section having a corresponding neighboring tile with an empty status, to generate a silhouette perimeter.

* * * * *